US012282669B2

United States Patent
Nubile et al.

(10) Patent No.: US 12,282,669 B2
(45) Date of Patent: *Apr. 22, 2025

(54) PRIORITIZED POWER BUDGET ARBITRATION FOR MULTIPLE CONCURRENT MEMORY ACCESS OPERATIONS

(71) Applicant: Micron Technology, Inc., Boise, ID (US)

(72) Inventors: Luca Nubile, Sulmona (IT); Walter Di Francesco, Avezzano (IT); Fumin Gu, San Jose, CA (US); Ali Mohammadzadeh, Mountain View, CA (US); Biagio Iorio, Avezzano (IT); Liang Yu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/621,747

(22) Filed: Mar. 29, 2024

(65) Prior Publication Data
US 2024/0272812 A1   Aug. 15, 2024

Related U.S. Application Data

(63) Continuation of application No. 17/668,311, filed on Feb. 9, 2022, now Pat. No. 11,977,748.
(Continued)

(51) Int. Cl.
*G06F 3/06* (2006.01)
(52) U.S. Cl.
CPC .......... *G06F 3/0625* (2013.01); *G06F 3/0653* (2013.01); *G06F 3/0659* (2013.01); *G06F 3/0679* (2013.01)

(58) Field of Classification Search
CPC .... G06F 3/0625; G06F 3/0653; G06F 3/0659; G06F 3/0679
See application file for complete search history.

(56) References Cited

U.S. PATENT DOCUMENTS

| 7,574,547 | B1 * | 8/2009 | Avudaiyappan | ...... G06F 13/364 370/395.42 |
| 2005/0198475 | A1 * | 9/2005 | Arnold | ................... G06F 9/3851 712/228 |

(Continued)

OTHER PUBLICATIONS

Fiske, Stuart, and William J. Dally. "Thread prioritization: A thread scheduling mechanism for multiple-context parallel processors." Future Generation Computer Systems 11.6 (1995): 503-518. (Year: 1995).*

(Continued)

*Primary Examiner* — Nicholas J Simonetti
(74) *Attorney, Agent, or Firm* — Lowenstein Sandler LLP

(57) ABSTRACT

A memory device includes a memory array and control logic, operatively coupled with the memory array. The control logic allocates power to one or more prioritized processing threads, of a plurality of processing threads that access the memory array, based on a value of a priority ring counter. The control logic starts a timer in response to detecting allocation of the power to a non-prioritized processing thread of the plurality of processing threads. While the timer is running, the control logic increments the priority ring counter before each power management cycle and prioritizes allocation of the power to the one or more prioritized processing threads located within a subset of the plurality of processing threads corresponding to a value of the priority ring counter.

20 Claims, 13 Drawing Sheets

Related U.S. Application Data

(60) Provisional application No. 63/243,887, filed on Sep. 14, 2021.

(56) References Cited

U.S. PATENT DOCUMENTS

| | | | |
|---|---|---|---|
| 2006/0095634 A1* | 5/2006 | Meyer | G06F 13/364 |
| | | | 710/309 |
| 2015/0089249 A1 | 3/2015 | Hannon et al. | |
| 2019/0065243 A1 | 2/2019 | Eckert | |
| 2021/0136659 A1* | 5/2021 | Ianev | H04W 28/02 |

OTHER PUBLICATIONS

Dimić, Vladimir, et al. "PrioRAT: Criticality-Driven Prioritization Inside the On-Chip Memory Hierarchy." European Conference on Parallel Processing. Cham: Springer International Publishing, Sep. 2021. (Year: 2021).*

Li, C., et al., "Priority Based Fair Scheduling: A Memory Scheduler Design for ChipMultiprocessor Systems," Tsinghua National Laboratory for Information Science and Technology, 2012, 6 Pages.

* cited by examiner

PRIORITIZED POWER BUDGET ARBITRATION FOR MULTIPLE CONCURRENT MEMORY ACCESS OPERATIONS

REFERENCE TO RELATED APPLICATION

This application is a continuation of U.S. patent application Ser. No. 17/668,311, filed Feb. 9, 2022, which claims the benefit of U.S. Provisional Patent Application No. 63/243,887, filed Sep. 14, 2021, the entirety of which is incorporated herein by reference.

TECHNICAL FIELD

Embodiments of the disclosure relate generally to memory sub-systems, and more specifically, relate to prioritized power budget arbitration for multiple concurrent memory access operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
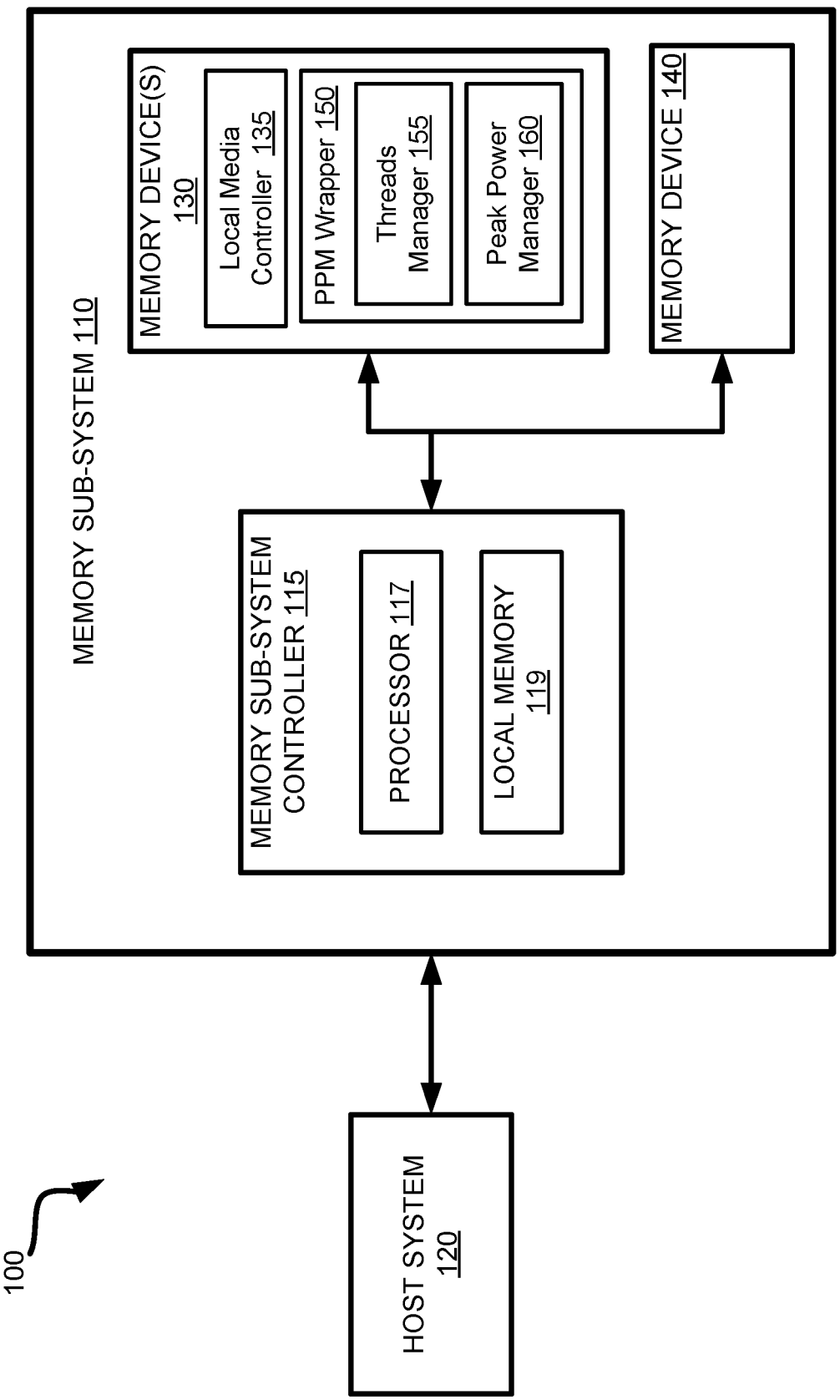
FIG. 1A illustrates an example computing system that includes a memory sub-system according to at least some embodiments.

Aspects of the present disclosure are directed to prioritized power budget arbitration for multiple concurrent memory access operations. One example of non-volatile memory devices is a negative-and (NAND) memory device. A memory device, to include each die of a multi-dice memory device, can be made up of bits arranged in a two-dimensional or a three-dimensional grid of memory cells. One or more physical blocks of memory cells can be grouped together to form a plane of the memory device in order to allow concurrent operations to take place on each plane, where these physical blocks are made up of groups of pages of memory cells.

Each memory die can include circuitry that performs concurrent memory page accesses of two or more memory planes. For example, each memory die can include multiple access line driver circuits and power circuits that can be shared by the planes of each memory die to facilitate concurrent access of pages of two or more memory planes, including different page types. For case of description, these circuits can be generally referred to as independent plane driver circuits. Control logic on each die of the memory device includes a number of separate processing threads to perform concurrent memory access operations (e.g., read operations, program operations, and erase operations). For example, each processing thread corresponds to a respective memory plane and utilizes the associated independent plane driver circuits to perform the memory access operations on the respective memory plane. As these processing threads operate independently, the power usage and requirements associated with each processing thread also varies.

The capacitive loading of three-dimensional memory is generally large and may continue to grow as process scaling continues. Various access lines, data lines and voltage nodes can be charged or discharged very quickly during sense (e.g., read or verify), program, and erase operations so that memory array access operations can meet the performance specifications that are often required to satisfy data throughput targets as might be dictated by customer requirements or industry standards, for example. For sequential read or programming, multi-plane operations are often used to increase the system throughput. As a result, a typical memory die can have a high peak current usage, which might be four to five times the average current amplitude. Thus, with such a high average market requirement of total current usage budget, it can become challenging to operate more than four memory dice concurrently, for example.

A variety of techniques have been utilized to manage power consumption of memory sub-systems containing multiple memory dice, many of which rely on a memory sub-system controller to stagger the activity of the memory dice seeking to avoid performing high power portions of access operations concurrently in more than one memory dice. Further, as additional processing threads are utilized on each individual memory die (e.g., 4, 6, or 8 processing threads), these power management techniques are not adequate to account for the added complexity associated with budgeting current usage within each individual memory die.

Aspects of the present disclosure address the above and other deficiencies by providing prioritized power budget arbitration for multiple concurrent access operations in a memory device of a memory sub-system. In some embodiments, the memory device includes multiple dice, each die including multiple processing threads configured to perform the concurrent memory access operations, e.g., on corresponding memory planes of the memory dice. Each memory die further includes a threads manager and a peak power manager (PPM) that are together configured to perform prioritized power budget arbitration for the multiple processing threads on respective memory die of the multiple memory dice.

In these embodiments, the memory sub-system employs a token-based round robin protocol, whereby each PPM rotates (e.g., after a set number of cycles of a shared clock signal) as a holder of the token and broadcasts a quantized current budget to be consumed by its respective memory die during a given time period. The other PPMs on each other memory die receive this broadcast information, and thus, can determine an available current budget in the memory device during the time period. While holding the token, a PPM can request a certain amount of current for its respective memory die up to the available current budget in the memory device and based on an amount of current being consumed by the other memory dice of the memory device. As described in further detail below, the PPM can employ a number of different techniques to allocate the requested current among the multiple processing threads of the respective memory die, at least some of which include prioritized management of multiple concurrent processing threads.

In at least some embodiments, each die also includes a priority ring counter and a data structure (such as a lookup table) where the data structure is to store an association between a value of the priority ring counter and a subset of the multiple processing threads. Each die can further include a threads manager configured to manage the multiple processing threads presented to the PPM for power allocation. In these embodiments, the threads manager can increment the value of the priority ring counter before a power management cycle. Each new counter value changes the subset of the multiple processing threads under consideration for power allocation, and thus simplifies the number of processing threads that the PPM can manage concurrently. The threads manager can also identify one or more prioritized processing threads within the subset of the multiple processing threads, and provide identification of prioritization with the one or more prioritized processing threads to the PPM. The PPM can then prioritize allocation requests when the die of the PPM holds the token, e.g., by prioritizing allocation of power to the one or more prioritized processing threads located within the subset of the multiple processing threads during the power management cycle. The PPM of the die can also check power allocation to the one or more prioritized processing threads against a power (e.g., current) budget available and thus avoid going over budget despite prioritization of some processing threads over others.

In at least some embodiments, the PPM of a die can also manage shifts between non-prioritized management of subsets of the multiple processing threads and prioritized management of the subsets of the multiple processing threads. For example, the PPM can start a timer while a non-prioritized processing thread (e.g., an erase operation or a program operation) is running and in response to detecting allocation of the power also to a prioritized thread of the multiple processing threads (e.g., a read operation or a program operation). The timer can track a predetermined amount of time in order to ensure that prioritized allocation requests do not starve the non-prioritized processing thread of current needed to complete processing. Thus, if the timer expires while the non-prioritized processing thread is still running, the control logic can force a transition back to allocating power between subsets of the processing threads based on increments to the value of a non-priority counter, e.g., based on non-prioritized power allocation.

Advantages of this approach include, but are not limited to, an effective power management scheme for a multi-dice memory sub-system where each memory die supports multiple processing threads operating concurrently. The disclosed techniques allow support for independent parallel plane access in a memory device with significantly reduced hardware resources in the memory sub-system. This approach is highly scalable as the number of processing threads increases and does not rely on external controller intervention. Further, by prioritizing power allocation to some processing threads depending on which subset of multiple processing threads is being managed, memory operations that should be processed quickly (such as read operations and some program operations) can be prioritized over memory operations that can be performed more slowly (such as erase operations and some program operations). The allocated power to the prioritized processing threads can still be checked against a power (e.g., current) budget to ensure not exceeding the budget. Further, as mentioned, use of the timer and shifting protocols can ensure that non-prioritized processing threads are not starved of power budget. Thus, the overall performance and quality of service provided by each memory die is improved.

FIG. 1A illustrates an example computing system 100 that includes a memory sub-system 110 according to at least some embodiments. The memory sub-system 110 can include media, such as one or more volatile memory devices (e.g., memory device 140), one or more non-volatile memory devices (e.g., one or more memory device(s) 130), or a combination of such media or memory devices. The memory sub-system 110 can be a storage device, a memory module, or a hybrid of a storage device and memory module.

The memory device(s) 130 can be non-volatile memory device(s). One example of non-volatile memory devices is a negative-and (NAND) memory device. A non-volatile memory device is a package of one or more dice or logical unit (LUNs). Thus, each memory device 130 can be a die (or LUN) or can be a multi-dice package that includes multiple dice (or LUNs) on a chip, e.g., an integrated circuit package of dice. Each die can include one or more planes. Planes can be grouped into logic units (LUN). For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Each memory device 130 can be made up of bits arranged in a two-dimensional or three-dimensional grid, also referred to as a memory array. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. The host system 120 can provide data to be stored at the memory sub-system 110 and can request data to be retrieved from the memory sub-system 110. As used herein, "coupled to" or "coupled with" or "operatively coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., the one or more memory device(s) 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLCs) can store multiple bits per cell, e.g., by way of additional threshold voltage ranges. In some embodiments, each of the memory device(s) 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage a memory device 130 (e.g., perform media management operations on the memory device 130). In some embodiments, memory sub-system 110 is a managed memory device, which is a raw memory device having control logic (e.g., local media controller 135) on the die and a controller (e.g., memory sub-system controller 115) for media management within the same memory device package. An example of a managed memory device is a managed NAND (MNAND) device.

In at least some embodiments, each memory device 130 includes a peak power manager (PPM) wrapper 150 that includes a threads manager 155 and a PPM 160 (peak power manager). In one embodiment, local media controller 135 of each memory device 130 includes at least a portion of the PPM wrapper 150. In such an embodiment, PPM wrapper 150 can be implemented using hardware or as firmware, stored on each memory device 130, executed by the control logic (e.g., local media controller 135) to perform the operations related to prioritized power budget arbitration for multiple concurrent access operations described herein. In some embodiments, the memory sub-system controller 115 includes at least a portion of the PPM wrapper 150. For example, the memory sub-system controller 115 can include a processor 117 (e.g., a processing device) configured to execute instructions stored in local memory 119 for performing the operations described herein.

In at least some embodiments, the PPM wrapper 150 can manage power prioritized budget arbitration for multiple concurrent access operations in the memory device(s) 130. In one embodiment, memory sub-system 110 employs a token-based protocol, where a token rotates (e.g., in round robin fashion) among multiple PPM wrappers 150 of multiple memory dice (e.g., after a set number of cycles of a shared clock signal). When the PPM wrapper 150 of a die holds the token, the PPM wrapper 150 can determine the power (e.g., current) requested by multiple processing threads (e.g., implemented by local media controller 135) of each memory device 130, select one or more prioritized processing threads of those multiple processing threads based on an available power budget in the memory sub-system, request that power from a shared current source in memory sub-system 110, and allocate the requested power to the selected processing threads. In some embodiments, if power is allocated to all prioritized processing threads and budget remains, the PPM wrapper 150 can allocate power to non-prioritized processing threads as well. The PPM wrapper 150 can further broadcast a quantized current budget to be consumed by the memory die during a given time period, so that the other PPM wrappers in memory sub-system 110 are aware of the available power budget. Further details with regards to the operations of each PPM wrapper 150 are described below.

Figure 1B:
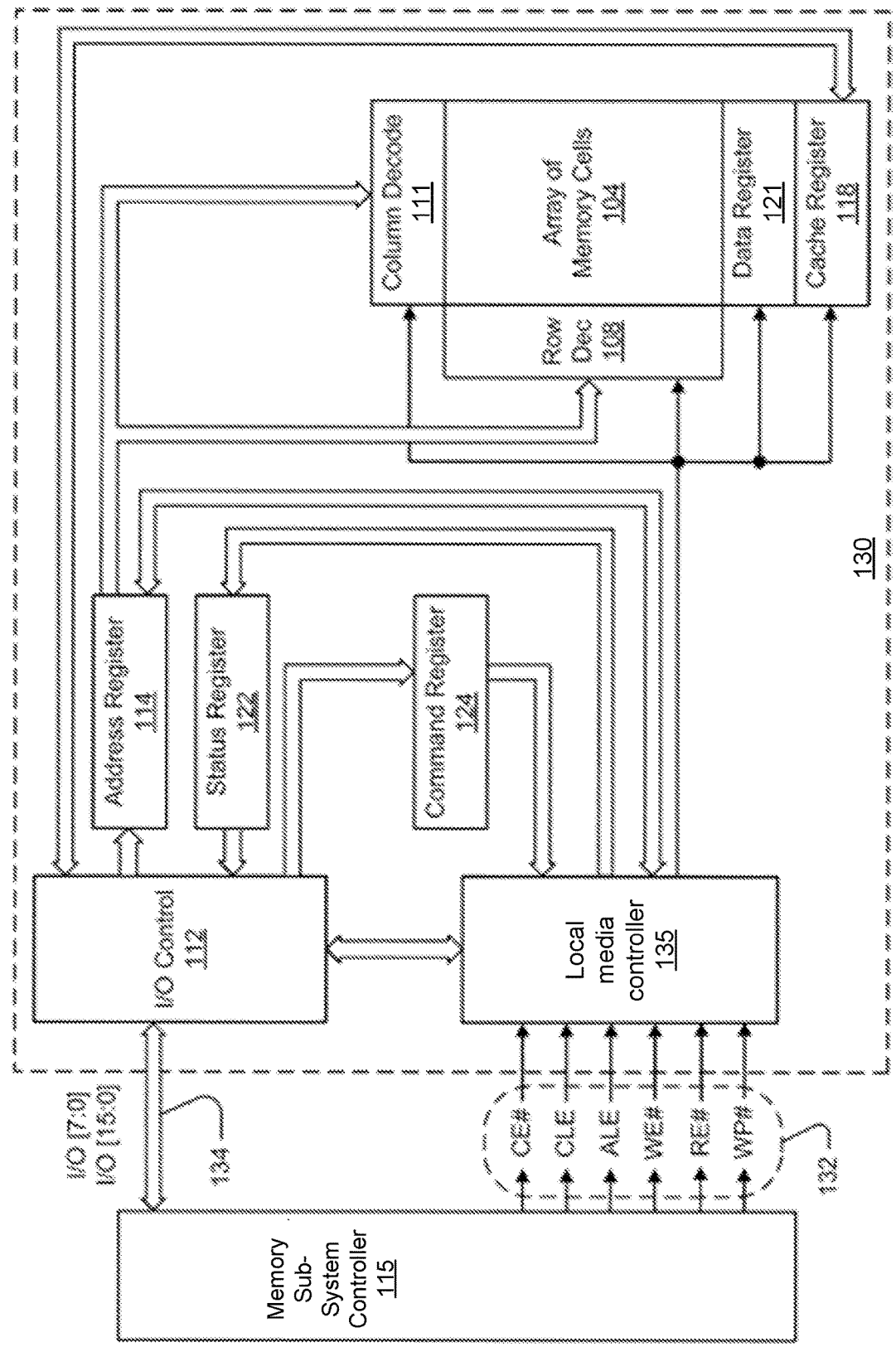
FIG. 1B is a block diagram of memory device(s) in communication with a memory sub-system controller of a memory sub-system according to an embodiment.

FIG. 1B is a simplified block diagram of a first apparatus, in the form of the one or more memory device(s) 130, in communication with a second apparatus, in the form of a memory sub-system controller 115 of a memory sub-system (e.g., the memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to each memory device 130), can be a memory controller or other external host device.

Each memory device 130 includes an array of memory cells 104 logically arranged in rows and columns. Memory cells of a logical row are typically connected to the same access line (e.g., a word line) while memory cells of a logical column are typically selectively connected to the same data line (e.g., a bit line). A single access line can be associated with more than one logical row of memory cells and a single data line can be associated with more than one logical column. Memory cells (not shown in FIG. 1B) of at least a portion of the array of memory cells 104 are capable of being programmed to one of at least two target data states.

Row decode circuitry 108 and column decode circuitry 111 are provided to decode address signals. Address signals are received and decoded to access the array of memory cells 104. Each memory device 130 also includes input/output (I/O) control circuitry 112 to manage input of commands, addresses and data to the memory device 130 as well as output of data and status information from each memory device 130. An address register 114 is in communication with the I/O control circuitry 112 and row decode circuitry 108 and column decode circuitry 111 to latch the address signals prior to decoding. A command register 124 is in communication with the I/O control circuitry 112 and the local media controller 135 to latch incoming commands.

A controller (e.g., the local media controller 135 internal to each memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 111 to control the row decode circuitry 108 and column decode circuitry 111 in response to the addresses.

The local media controller 135 is also in communication with a cache register 118 and a data register 121. The cache register 118 latches data, either incoming or outgoing, as directed by the local media controller 135 to temporarily store data while the array of memory cells 104 is busy writing or reading, respectively, other data. During a program operation (e.g., write operation), data can be passed from the cache register 118 to the data register 121 for transfer to the array of memory cells 104; then new data can be latched in the cache register 118 from the I/O control circuitry 112. During a read operation, data can be passed from the cache register 118 to the I/O control circuitry 112 for output to the memory sub-system controller 115; then new data can be passed from the data register 121 to the cache register 118. The cache register 118 and/or the data register 121 can form (e.g., can form at least a portion of) the page buffer of each memory device 130. The page buffer can further include sensing devices such as a sense amplifier, to sense a data state of a memory cell of the array of memory cells 104, e.g., by sensing a state of a data line connected to that memory cell. A status register 122 can be in communication with I/O control circuitry 112 and the local memory controller 135 to latch the status information for output to the memory sub-system controller 115.

Each memory device 130 receives control signals at the memory sub-system controller 115 from the local media controller 135 over a control link 132. For example, the control signals can include a chip enable signal CE#, a command latch enable signal CLE, an address latch enable signal ALE, a write enable signal WE#, a read enable signal RE#, and a write protect signal WP#. Additional or alternative control signals (not shown) can be further received over control link 132 depending upon the nature of each memory device 130. In one embodiment, each memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 112 and can then be written into a command register 124. The addresses can be received over input/output (I/O) pins [7:0] of I/O bus 134 at I/O control circuitry 112 and can then be written into address register 114. The data can be received over input/output (I/O) pins [7:0] for an 8-bit device or input/output (I/O) pins [15:0] for a 16-bit device at I/O control circuitry 112 and then can be written into cache register 118. The data can be subsequently written into data register 121 for programming the array of memory cells 104.

In an embodiment, cache register 118 can be omitted, and the data can be written directly into data register 121. Data can also be output over input/output (I/O) pins [7:0] for an 8-bit device or input/output (I/O) pins [15:0] for a 16-bit device. Although reference can be made to I/O pins, they can include any conductive node providing for electrical connection to each memory device 130 by an external device (e.g., the memory sub-system controller 115), such as conductive pads or conductive bumps as are commonly used.

It will be appreciated by those skilled in the art that additional circuitry and signals can be provided, and that each memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2:
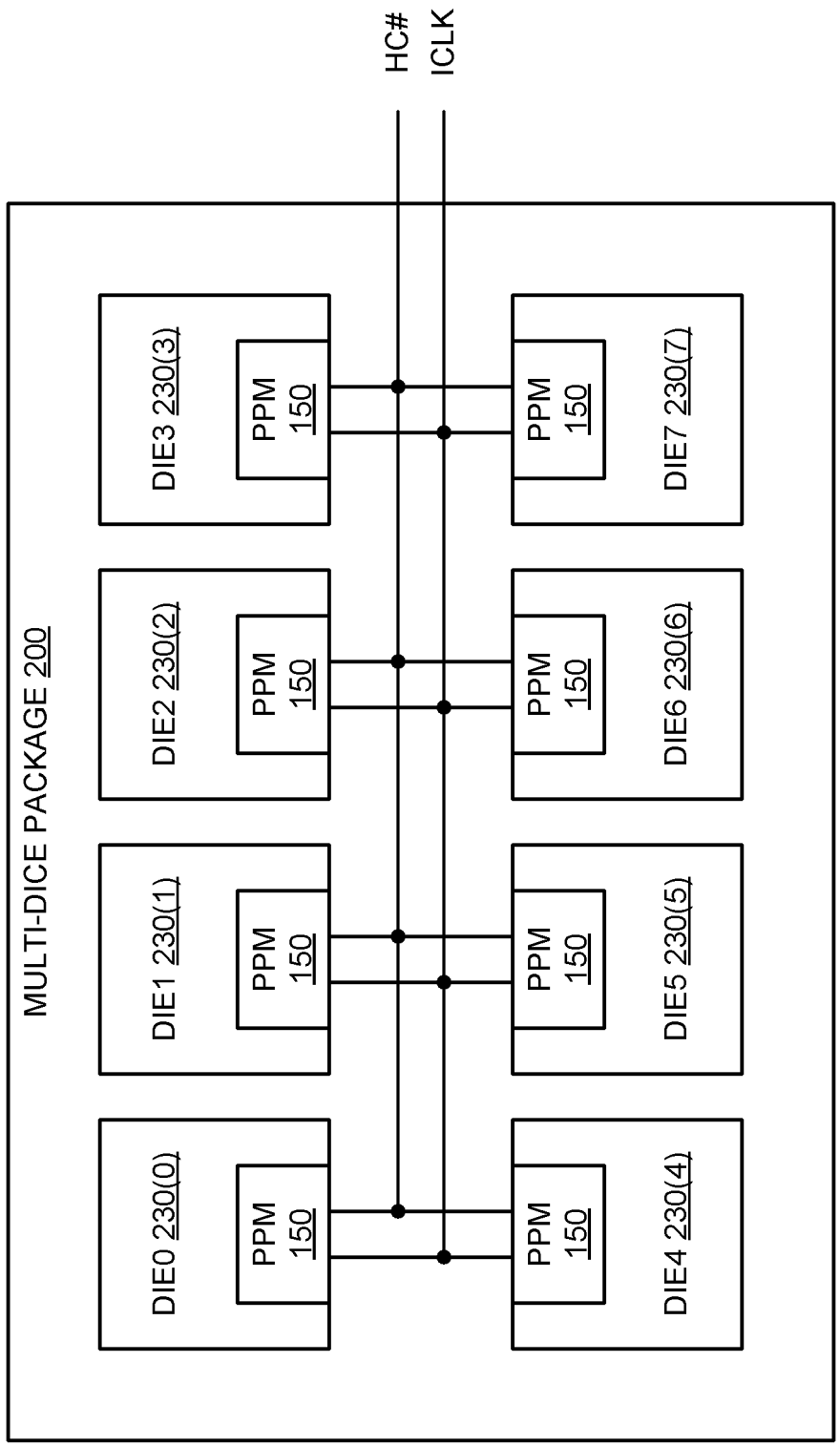
FIG. 2 is a block diagram illustrating a multi-dice package with multiple memory dice in a memory sub-system according to at least some embodiments.

FIG. 2 is a block diagram illustrating a multi-dice package with multiple memory dice in a memory sub-system according to at least some embodiments. As illustrated, multi-dice package 200 includes any of memory dice 230(0)-230(7). In other embodiments, however, multi-dice package 200 can include some other number of memory dice, such as additional or fewer memory dice. In at least one embodiment, the multi-dice package 200 is at least one of the memory devices 130 illustrated and discussed with respect to FIGS. 1A-1B. In one embodiment, memory dice 230(0)-230(7) share a clock signal ICLK which is received via a clock signal line. Memory dice 230(0)-230(7) can be selectively enabled in response to a chip enable signal (e.g. via a control link), and can communicate over a separate I/O bus. In addition, a peak current magnitude indicator signal HC# is commonly shared between the memory dice 230(0)-230(7). The peak current magnitude indicator signal HC# can be normally pulled to a particular state (e.g., pulled high). In one embodiment, each of memory dice 230(0)-230(7) includes an instance of the PPM wrapper 150, which receives both the clock signal ICLK and the peak current magnitude indicator signal HC#.

In one embodiment, a token-based protocol is used where a token cycles through each of the memory dice 230(0)-230(7) for determining and broadcasting expected peak current magnitude, even though some of the memory dice 230(0)-230(7) might be disabled in response to their respective chip enable signal. The period of time during which a given PPM wrapper 150 holds this token (e.g. a certain number of cycles of clock signal ICLK) can be referred to herein as a power management cycle of the associated memory die. At the end of the power management cycle, the token is passed to a next memory die in sequence. Eventually the token is received again by the same PPM wrapper 150 which signals the beginning of t hew power management cycle for the associated memory die. In one embodiment, the encoded value for the lowest expected peak current magnitude is configured such that each of its digits correspond to the normal logic level of the peak current magnitude indicator signal HC# where the disabled dice do not transition the peak current magnitude indicator signal HC#. In other embodiments, however, the memory dice can be configured, when otherwise disabled in response to their respective chip enable signal, to drive transitions of the peak current magnitude indicator signal HC# to indicate the encoded value for the lowest expected peak current magnitude upon being designated.

When a given PPM wrapper 150 holds the token, it can determine the peak current magnitude for the respective one of memory die 230(0)-230(7), which can be attributable to one or more processing threads on that memory die, and broadcast an indication of the same via the peak current magnitude indicator signal HC#. As described in more detail below, during a given power management cycle, the PPM wrapper 150 can arbitrate among the multiple processing threads on the respective memory die using one of a number of different arbitration schemes in order to allocate that peak current to enable concurrent memory access operations.

Figure 3:
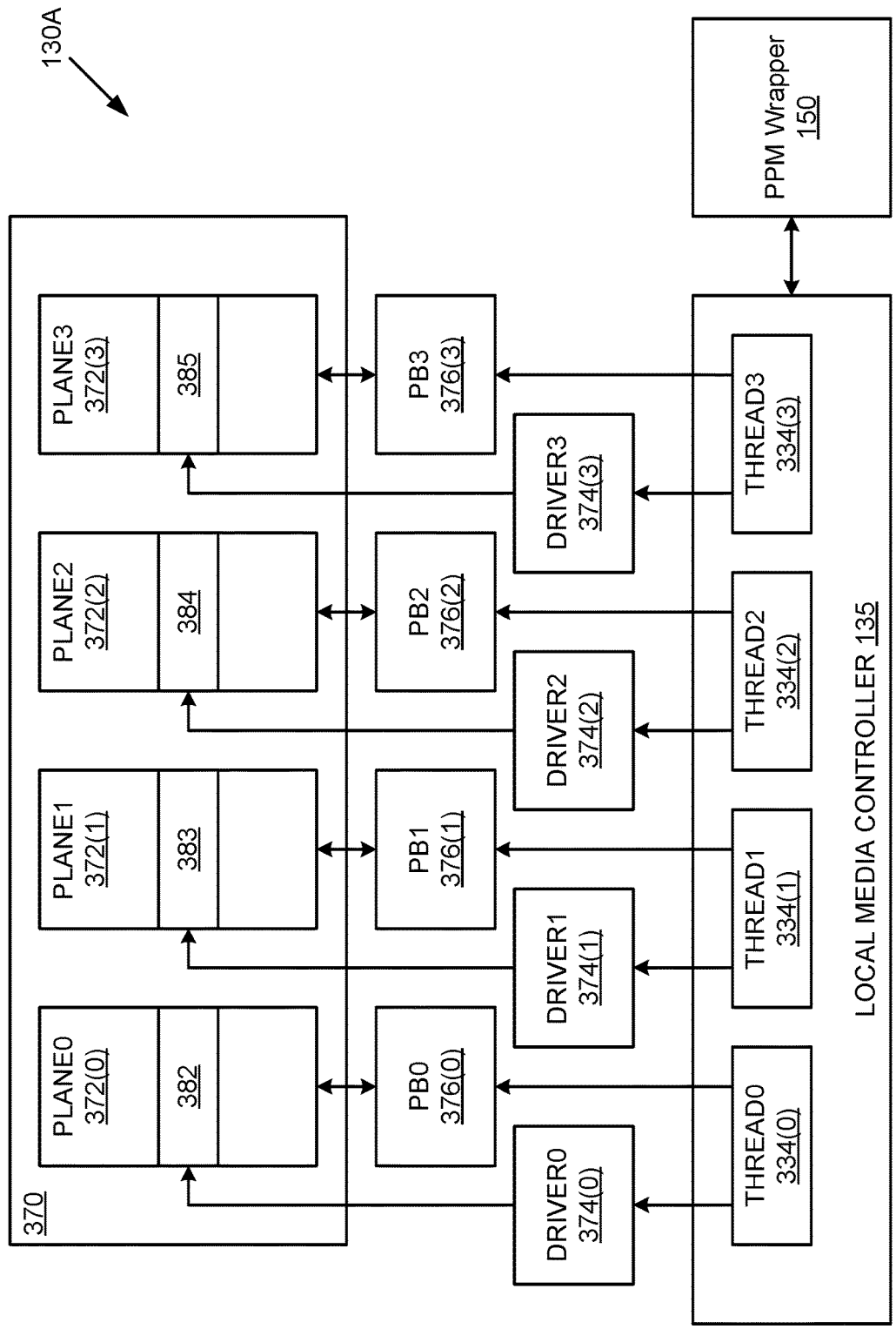
FIG. 3 is a block diagram illustrating a multi-plane memory device configured for parallel plane access according to at least some embodiments.

FIG. 3 is a block diagram illustrating a multi-plane memory device 130A configured for independent parallel plane access according to at least some embodiments. In at least one embodiment, the multi-plane memory device 130A is at least one of the memory device(s) 130 illustrated and discussed with reference to FIGS. 1A-1B. The memory planes 372(0)-372(3) can each be divided into blocks of data, with a different relative block of data from two or more of the memory planes 372(0)-372(3) concurrently accessible during memory access operations. For example, during memory access operations, two or more of data block 382 of the memory plane 372(0), data block 383 of the memory plane 372(1), data block 384 of the memory plane 372(2), and data block 385 of the memory plane 372(3) can each be accessed concurrently.

The memory device 130A includes a memory array 370 divided into memory planes 372(0)-372(3) that each includes a respective number of memory cells. The multi-plane memory device 130A can further include local media controller 135, including a power control circuit and access control circuit for concurrently performing memory access operations for different memory planes 372(0)-372(3). The memory cells can be non-volatile memory cells, such as NAND flash cells, or can generally be any type of memory cells.

The memory planes 372(0)-372(3) can each be divided into blocks of data, with a different relative block of data from each of the memory planes 372(0)-372(3) concurrently accessible during memory access operations. For example, during memory access operations, data block 382 of the memory plane 372(0), data block 383 of the memory plane 372(1), data block 384 of the memory plane 372(2), and data block 385 of the memory plane 372(3) can each be accessed concurrently.

Each of the memory planes 372(0)-372(3) can be coupled to a respective page buffer 376(0)-376(3). Each page buffer 376(0)-376(3) can be configured to provide data to or receive data from the respective memory plane 372(0)-372(3). The page buffers 376(0)-376(3) can be controlled by local media controller 135. Data received from the respective memory plane 372(0)-372(3) can be latched at the page buffers 376(0)-376(3), respectively, and retrieved by local media controller 135, and provided to the memory subsystem controller 115 via the NVMe interface.

Each of the memory planes 372(0)-372(3) can be further coupled to a respective access driver circuit 374(0)-374(3), such as an access line driver circuit. The driver circuits 374(0)-374(3) can be configured to condition a page of a respective block of an associated memory plane 372(0)-372(3) for a memory access operation, such as programming data (i.e., writing data), reading data, or erasing data. Each of the driver circuits 374(0)-374(3) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(3) can be controlled based on signals from local media controller 135. Each of the driver circuits 374(0)-374(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 374(0)-374(3) and page buffers 376(0)-376(3) to concurrently perform memory access operations associated with each of a group of memory command and address pairs (e.g., received from memory sub-system controller 115). For example, local media controller 135 can control the driver circuits 374(0)-374(3) and page buffer 376(0)-376(3) to perform the concurrent memory access operations. Local media controller 135 can include a power control circuit that serially configures two or more of the driver circuits 374(0)-374(3) for the concurrent memory access operations, and an access control circuit configured to control two or more of the page buffers 376(0)-376(3) to sense and latch data from the respective memory planes 372(0)-372(3), or program data to the respective memory planes 372(0)-372(3) to perform the concurrent memory access operations.

In operation, local media controller 135 can receive a group of memory commands and address pairs via the NVMe bus, with each pair arriving in parallel or serially. In some examples, the group of memory commands and address pairs can each be associated with different respective memory planes 372(0)-372(3) of the memory array 370. The local media controller 135 can be configured to perform concurrent memory access operations (e.g., read operations or program operations) for the different memory planes 372(0)-372(3) of the memory array 370 responsive to the group of memory commands and address pairs. For example, the power control circuit of local media controller 135 can serially configure, for the concurrent memory access operations based on respective page type (e.g., UP, MP, LP, XP, SLC/MLC/TLC/QLC page), the driver circuits 374(0)-374(3) for two or more memory planes 372(0)-372(3) associated with the group of memory commands and address pairs. After the access line driver circuits 374(0)-374(3) have been configured, the access control circuit of the local media controller 135 can concurrently control the page buffers 376(0)-376(3) to access the respective pages of each of the two or more memory planes 372(0)-372(3) associated with the group of memory commands and address pairs, such as retrieving data or writing data, during the concurrent memory access operations. For example, the access control circuit can concurrently (e.g., in parallel and/or contemporaneously) control the page buffers 376(0)-376(3) to charge/discharge bitlines, sense data from the two or more memory planes 372(0)-372(3), and/or latch the data.

Based on the signals received from local media controller 135, the driver circuits 374(0)-374(3) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(3) can drive different respective global access lines associated with a respective memory plane 372(0)-372(3). As an example, the driver circuit 374(0) can drive a first voltage on a first global access line associated with the memory plane 372(0), the driver circuit 374(1) can drive a second voltage on a third global access line associated with the memory plane 372(1), the driver circuit 374(2) can drive a third voltage on a seventh global access line associated with the memory plane 372(2), etc., and other voltages can be driven on each of the remaining global access lines. In some examples, pass voltages can be provided on all access lines except on an access line associated with a page of a memory plane 372(0)-372(3) to be accessed. The local media controller 135, the driver circuits 374(0)-374(3) can allow different respective pages, and the page buffers 376(0)-376(3) within different respective blocks of memory cells, to be accessed concurrently. For example, a first page of a first block of a first memory plane can be accessed concurrently with a second page of a second block of a second memory plane, regardless of page type.

The page buffers 376(0)-376(3) can provide data to or receive data from the local media controller 135 during the memory access operations responsive to signals from the local media controller 135 and the respective memory planes 372(0)-372(3). The local media controller 135 can provide the received data to memory sub-system controller 115.

It will be appreciated that the memory device 130A can include more or less than four memory planes, driver circuits, and page buffers. It will also be appreciated that the respective global access lines can include 8, 16, 32, 64, 128, etc., global access lines. The local media controller 135 and the driver circuits 374(0)-374(3) can concurrently access different respective pages within different respective blocks of different memory planes when the different respective pages are of a different page type. For example, local media controller 135 can include a number of different processing threads, such as processing threads 334(0)-334(3). Each of processing threads 334(0)-334(3) can be associated with a respective one of memory planes 372(0)-372(3) and can manage operations performed on the respective plane. For example, each of processing threads 334(0)-334(3) can provide control signals to the respective one of driver circuits 374(0)-374(3) and page buffers 376(0)-376(3) to perform those memory access operations concurrently (e.g., at least partially overlapping in time). Since the processing threads 334(0)-334(3) can perform the memory access operations, each of processing threads 334(0)-334(3) can have different current requirements at different points in time. According to the techniques described herein, the PPM wrapper 150 can determine the power budget needs of processing threads 334(0)-334(3) in a given power management cycle and identify one or more of processing threads 334(0)-334(3) using one of a number of power budget arbitration schemes described herein. The one or more processing threads 334(0)-334(3) can be determined based on an available power budget in the memory sub-system 110 during the power management cycles. For example, the PPM wrapper 150 can determine respective priorities of processing threads 334(0)-334(3), and allocate current to processing threads 334(0)-334(3) based on the respective priorities.

Figure 4:
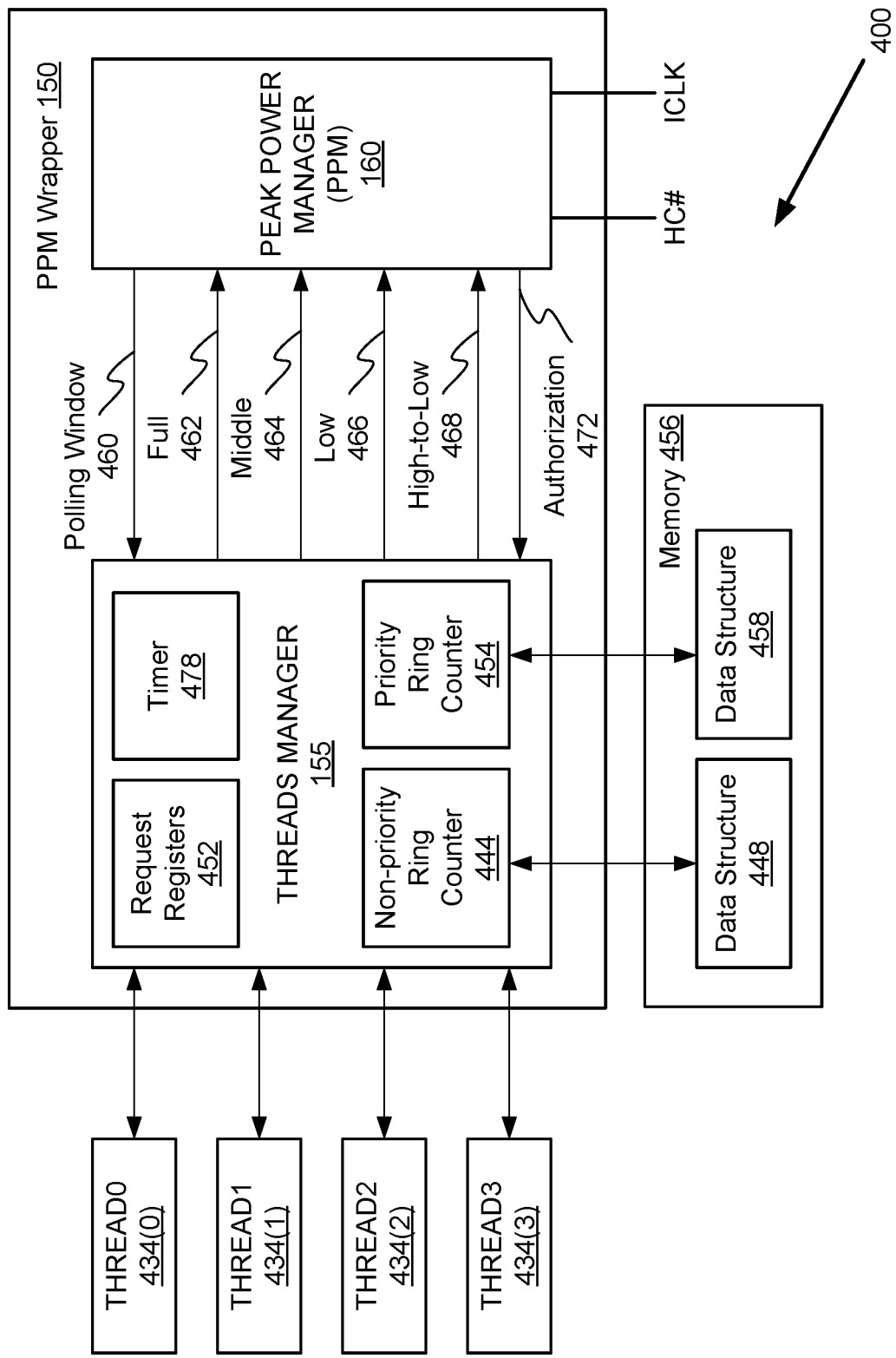
FIG. 4 is a block diagram illustrating a memory die configured for prioritized power budget arbitration for multiple processing threads according to at least some embodiments.

FIG. 4 is a block diagram illustrating a memory die 400 configured for power budget arbitration for multiple processing threads according to at least some embodiments. In some embodiments, the memory die 400 includes control logic, such as the PPM wrapper 150, which in turn includes the threads manager 155 and the PPM 160 discussed with reference to FIG. 1A. The memory die 400 further includes a memory 456, e.g., a register, DRAM, SDRAM, or the like, although the memory 456 can also make reference to the memory array 370 in some embodiments. In these embodiments, the threads manager 155 includes request registers 452 (or other internal PPM memory) and includes or is coupled to a timer 478. The threads manager 155 can further include a non-priority ring counter 444 and a priority ring counter 454 that are coupled to the memory 456, e.g., for access to a data structure 448 and a data structure 458, respectively. The PPM 160 is coupled to the threads manager 155, can also be coupled with the memory 456, and receives both the clock signal ICLK and the peak current magnitude indicator signal HC#, as were discussed previously.

In some embodiments, the threads manager 155 identifies one or more processing threads, such as multiple processing threads 434(0)-434(3) in memory die 400, and requests the PPM 160 to determine whether an available current (e.g., power) budget can support running the one or more processing threads based on an amount of power associated with the one or more processing threads during a power management cycle. More specifically, because the multiple processing threads 434(0)-434(3) can generate different requests asynchronously, to manage such complexity, the threads manager 155 can manipulate and summarize these asynchronous requests in a simplified number of requests for the PPM 160. In some embodiments, a set of simplified requests sent to the PPM 160 can contain randomized thread requests to ensure equity of allocation of current to the multiple processing threads 434(0)-434(3). As will be discussed in more detail, the randomization of the requests sent by the threads manger 155 to the PPM 160 can be performed by the non-priority ring counter 444, by the priority ring counter 454, or can shift between the two ring counters as will be discussed. In some embodiments, the multiple processing threads 434(0)-434(3) correspond to the processing threads 334(0)-334(3) (FIG. 3).

In some embodiments, the PPM 160 periodically asserts a polling window signal 460, which is received by the threads manager 155. The polling window signal 460 is asserted after the end of a previous power management cycle (e.g., when the PPM 160 gives up the token) and prior to the beginning of a subsequent power management cycle (e.g., when PPM 160 receives the token again). As the processing threads 434(0)-434(3) are regularly issuing requests for current depending on associated processing operations, during a period when the polling window signal 460 is asserted, the threads manager 155 stores or buffers the received requests in a the request registers 452. While requests are often referred to herein as requesting current allocation, this should be understood as requesting power generally, e.g., can also include requesting voltage allocation.

In some embodiments, the PPM 160 tracks the token and can determine when the token will be received (e.g., based on synchronous clock signal ICLK) and can de-assert the polling window signal 460 in advance of that time. Responsive to the polling window signal 460 being deasserted (i.e., during the subsequent the power management cycle), the threads manager 155 can stop storing additional requests in request registers 452 so that the contents of request registers 452 is static. Any new requests are not considered during this cycle, but are saved and can be considered in a subsequent power management cycle. The threads manager 155 can generate multiple current level signals, such as a full signal 462, a middle signal 464, a low signal 466, and a high-to-low signal 468 where each current level signal corresponds to the current associated with a respective set of at least one of the requests in the request registers 452. For example, the full signal 462 can represent the sum of all current requests in the request registers 452, the middle signal 464 can represent the sum of two or more, but less than all, of the current requests in the request registers 452 (e.g., the first two or more requests in the request registers 452), the low signal 466 can represent one current request from the request registers 452 (e.g., the first request in the request registers 452), and the high-to-low signal 468 can represent a low current request when a high current budget has already been allocated. The high-to-low signal 468 can be associated with requests in the request registers 452 for which the PPM 160 will immediately allocate current, without checking against a current budget, and will track such allocation as with tracking other current allocations. By polling the processing threads between power management cycles, the threads manager 155 can save significant time and processing resources compared to waiting until the token is actually received.

In these embodiments, the PPM 160 receives the full signal 462, the middle signal 464, the low signal 466, and the high-to-low signal 468 and determines whether the amount of current associated with any of these current level signals can be satisfied by an amount of current available in the memory sub-system 110 during the current power management cycle. Responsive to the amount of current available satisfying at least one of the current level signals, the PPM 160 can request that amount of current and provide an authorization signal 472, e.g., an acknowledgement, to the threads manager 155. The authorization signal 472 can indicate which of the current level signals is satisfied by the amount of available current, for example. The threads manager 155 can thus authorize one or more of processing threads 434(0)-434(3) to perform one or more memory access operations corresponding to the request in the request registers 452 based on which requests were authorized by the authorization signal 472.

Figure 5:
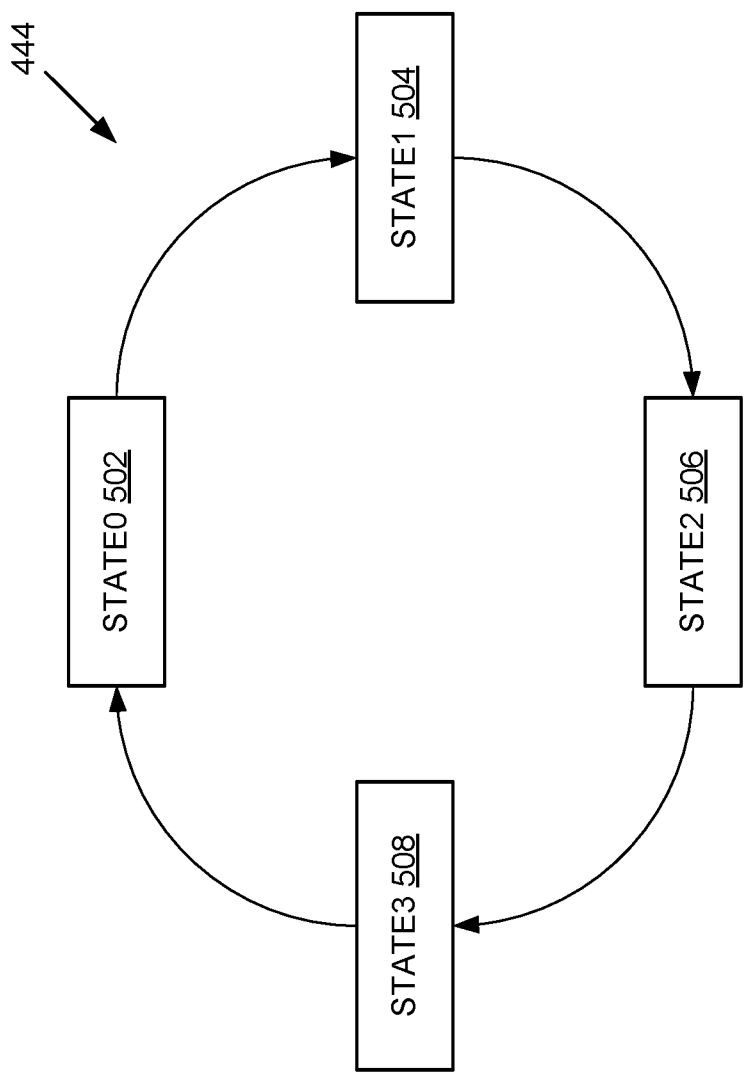
FIG. 5 is a block diagram illustrating operation of a non-priority ring counter implemented by a threads manager of a memory die according to at least some embodiments.

FIG. 5 is a block diagram illustrating operation of the non-priority ring counter 444 implemented by the threads manager 155 of a memory die, which were discussed with reference to FIG. 4 according to some embodiments. In one embodiment, the non-priority ring counter 444 is formed in PPM 160 using flip-flops, or other devices, connected into a shift register, such that the output of the last flip-flop feeds into the input of the first flip-flop, to form the circular or "ring" structure. In one embodiment, the non-priority ring counter 444 is an n-bit counter representing $2^n$ different states, where $2^n$ represents the number of different processing threads, such as processing threads 434(0)-434(3) in the memory device 130 or 130A. In some embodiments, the priority ring counter 454 functions similarly to the non-priority ring counter 444, but the incremented value of the priority ring counter 454 can track subsets of prioritized processing thread as will be discussed in more detail.

As illustrated in FIG. 5 by way of example, the non-priority ring counter 444 is a 2-bit counter representing 4 different states (i.e., state0 502, state 1 504, state2, 506, and state3 508. In operation, the non-priority ring counter 444 cycles sequentially through each of the 4 states 502-508 responsive to a change in the power management cycle. For example, if the non-priority ring counter 444 is initially set to state0 402, when the PPM 160 receives the token, a value of the non-priority ring counter 444 is incremented (e.g., by 1) causing the non-priority ring counter 444 to shift to state1 504. Similarly, the next time the PPM 160 receives the token, the value is again incremented causing the ring counter to shift to state2 506, and so forth. When set to state3 508, and the value is incremented, the non-priority ring counter 444 will return to state0 502. As described in more detail below, each state (or value) of the non-priority ring counter 444 is associated with one or more processing threads, thereby allowing the threads manager 155 to select one or more processing threads of the memory device based on the current state of the non-priority ring counter 444. Thus, a subset of the multiple processing threads sent to the PPM 160 changes according to the non-priority ring counter 444, allowing the PPM 160 to handle power allocation of fewer number of threads at a time. This simplifies the control logic of the PPM 160. Further, the non-priority ring counter 444 functions so as rotate to all the processing threads equally after passing through the four values or states of the non-priority ring counter 444.

More specifically, Table 1 is an example of the data structure 448 of the PPM wrapper 150 used for power budget arbitration for multiple processing threads in the memory device 130 or 130A. In one embodiment, the data structure 448 is formed in or managed by the threads manager 155 using a lookup table, an array, a linked list, a record, an object, other some other data structure. In one embodiment, the data structure 448 includes a number of entries, each corresponding to one of the states of the non-priority ring counter 444. For example, for each state of the non-priority ring counter 444, the data structure 448 can identify a leading thread, and a thread combination. The leading thread can be a single processing thread having the highest priority when the non-priority ring counter 444 is in the corresponding state, and the thread combination can be a set of two or more processing threads, but less than all of the processing threads, which have a higher priority than other threads not in the set, but a lower priority than the leading thread, when the non-priority ring counter 444 is in the corresponding state.

TABLE 1

| Ring Counter State/Value | Leading Thread | Thread Combination |
|---|---|---|
| State0 | Thread0 | Thread0 + Thead1 |
| State1 | Therad1 | Thread1 + Thread2 |
| State2 | Thread2 | Thead2 + Thread3 |
| State3 | Thread3 | Thread3 + Thead0 |

In some embodiments, to allocate available power budget during a power management cycle, the threads manager 155 can determine a current state of the non-priority ring counter 444 and determine, from the data structure 448, a leading thread and a thread combination corresponding to the current state of the non-priority ring counter 444. The threads manager 155 can then send requests to the PPM 160, e.g., the full signal 462, the middle signal 464, and the low signal 466 based on identification of the leading thread and the thread combination. Responsive to an amount of current available in the memory sub-system during that power management cycle satisfying an amount of current associated with at least one of the leading thread or the thread combination, the PPM 160 can request that amount of current associated with the at least one of the leading thread or the thread combination and allocate that current budget accordingly.

By way of an additional example, Table 2 illustrates the data structure 448 in which a 3-bit non-priority counter 444 can hold up to eight states or values, and thus the data structure 448 can store additional combinations of possible leading threads and thread combinations. The 3-bit example of Table 2 and other Tables included below are merely exemplary for purposes of explanation, as other are envisioned, including those of 4-bit and beyond. In Table 2, the "Reg_hc_max" value corresponds to the full signal 462, the "Reg_hc_middle" corresponds to the middle signal 464, and the "Reg_hc_min" corresponds to the low signal 466.

TABLE 2

| Processing Threads | Ring_counter value |
|---|---|
| Reg_hc_max = Main + coproc1 + coproc2 + coproc3 + coproc4 + coproc5<br>Reg_hc_middle = main + coproc1 + coproc2<br>Reg_hc_min = main | 3'b000 |
| Reg_hc_max = Main + coproc1 + coproc2 + coproc3 + coproc4 + coproc5<br>Reg_hc_middle = coproc1 + coproc2 + coproc3<br>Reg_hc_min = coproc1 | 3'b001 |
| Reg_hc_max = Main + coproc1 + coproc2 + coproc3 + coproc4 + coproc5<br>Reg_hc_middle = coproc2 + coproc3 + coproc4<br>Reg_hc_min = coproc2 | 3'b010 |
| . . . | . . . |
| Reg_hc_max = Main + coproc1 + coproc2 + coproc3 + coproc4 + coproc5<br>Reg_hc_middle = coproc5 + main + coproc1<br>Reg_hc_min = coproc5 | 3b'101 |

In this example, the full signal 462 can correspond to all of the multiple processing threads requesting current, e.g., a main processing thread of the local media controller 135, and five additional co-processors ("coproc") that can be associated with individual additional threads such as the threads0-thread3 434(0)-434(3), although more co-processors are envisioned. Further, the middle signal 464 can include a subset of the multiple processing threads (e.g., a thread combination), and the low signal 466 can include just one of the processing threads (e.g., leading thread) of the multiple processing threads. In one embodiment, the subset of the multiple processing threads is no more than half of the multiple processing threads.

Figure 6:
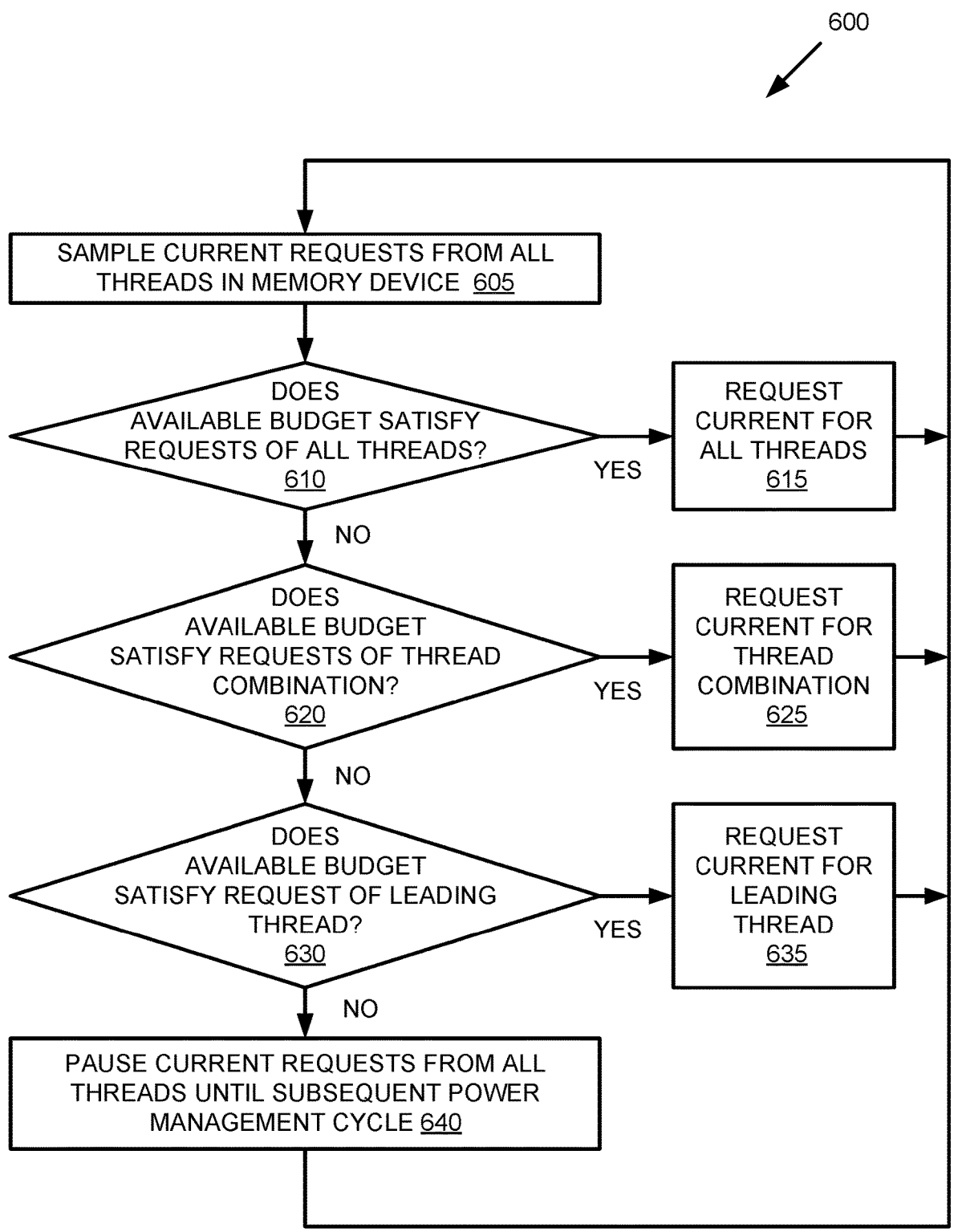
FIG. 6 is a flow diagram of an example method of power budget arbitration in a memory device using a ring counter according to at least some embodiments.

FIG. 6 is a flow diagram of an example method 600 of power budget arbitration in a memory device using a ring counter according to at least some embodiments. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the PPM wrapper 150 of FIG. 1A and FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, power requests are sampled. For example, processing logic (e.g., PPM 160) can sample power requests, such as current requests or peak current magnitude requests, from one or more processing threads, such as processing threads 334(0)-334(3), of a memory device. In one embodiment, responsive to the PPM 160 receiving the token, which signals the start of a current power management cycle, PPM 160 alerts the threads manager 155 of the start of the polling window 460. In response, the threads manager 155 sends polling requests to each of the processing threads to obtain an indication of current requested during the current power management cycle. The amount of current requested can be based on a number of memory access requests pending for each processing thread and the type of memory access requests pending for each processing thread. In one embodiment, each processing thread returns a separate response to the polling request, such that threads manager 155 can determine the current request of each processing thread separately. In one embodiment, another component, or a sub-component of the PPM wrapper 150 can issue the polling requests to and receive the current requests from the processing threads.

At operation 610, an available power budget is determined. For example, the processing logic can determine an amount of current available in the memory device during the power management cycle. In one embodiment, the PPM 160 receives a signal, such as peak current magnitude indicator signal HC#, indicating the current utilized by each other PPM 160 in the multi-dice package 200 and subtracts that amount from a total amount of available current in the memory sub-system 110 or memory device 130 or 130A. In one embodiment, the processing logic compares the total current associated with all processing threads (e.g., the sum of the individual current requests) to the amount of available current during the power management cycle to determine if the available current budget satisfies the current requests of all processing threads. If the amount of current available is equal to or greater than the amount of current associated with (e.g., demanded by) all of the processing threads, the processing logic determines that the amount of current available satisfies the amount of current associated with all of the processing threads.

At operation 615, current is requested and allocated. If the processing logic determines that the amount of current available satisfies the amount of current associated with all of the processing threads, the processing logic can request the amount of current associated with all of the processing threads. For example, the PPM 160 can issue the request to a common current supply or other power source in the memory device 130 or 130A or memory sub-system 110. The PPM 160 can subsequently allocate the requested current to the processing threads, allowing all of the processing threads to complete their pending memory access operations.

If the processing logic determines that the amount of current available does not satisfy the amount of current associated with all of the processing threads, at operation 620, a thread combination is examined. For example, the processing logic can identify, from a data structure, such as data structure 448, a thread combination that corresponds to a current state of a ring counter, such as the non-priority ring counter 444. The thread combination corresponding to each state of the non-priority ring counter 444 is different ensuring that different threads are serviced in different power management cycles and no threads are ignored. In one embodiment, the processing logic compares the total current associated with the identified thread combination (e.g., the sum of the individual current requests) to the amount of available current during the power management cycle to determine if the available current budget satisfies the current requests of the thread combination. If the amount of current available is equal to or greater than the amount of current associated with the thread combination, the processing logic determines that the amount of current available satisfies the amount of current associated with the thread combination.

At operation 625, current is requested and allocated. If the processing logic determines that the amount of current available satisfies the amount of current associated with the thread combination, the processing logic can request the amount of current associated with the thread combination. For example, the PPM 160 can issue the request to a common current supply or other power source in the memory device 130 or 130A or memory sub-system 110. The PPM 160 can subsequently allocate the requested current to the processing threads, allowing the processing threads identified in the thread combination to complete their pending memory access operations.

If the processing logic determines that the amount of current available does not satisfy the amount of current associated with the thread combination, at operation 630, a leading thread is examined. For example, the processing logic can identify, from a data structure, such as data structure 448, a leading thread that corresponds to a current state of a ring counter, such as the non-priority ring counter 444. The leading thread corresponding to each state of the non-priority ring counter 444 is different ensuring that different threads are serviced in different power management cycles and no threads are ignored. In one embodiment, the processing logic compares the requested current associated with the identified leading thread to the amount of available current during the power management cycle to determine if the available current budget satisfies the current request of the leading thread. If the amount of current available is equal to or greater than the amount of current associated with the leading thread, the processing logic determines that the amount of current available satisfies the amount of current associated with the leading thread.

At operation 635, current is requested and allocated. If the processing logic determines that the amount of current available satisfies the amount of current associated with the leading thread, the processing logic can request the amount of current associated with the leading thread. For example, the PPM 160 can issue the request to a common current supply or other power source in the memory device 130 or 130A or memory sub-system 110. The PPM 160 can subsequently allocate the requested current to the leading thread, allowing the leading thread to complete its pending memory access operations.

If the processing logic determines that the amount of current available does not satisfy the amount of current associated with the leading thread, at operation 640, the current requests are paused. For example, the processing logic can pause execution of the processing threads and maintain the current requests from those processing threads until a subsequent power management cycle. In the subsequent power management cycle, there can possibly be a larger amount of available current in the memory device which can be sufficient to satisfy the request associated with at least one of the processing threads.

Figure 7:
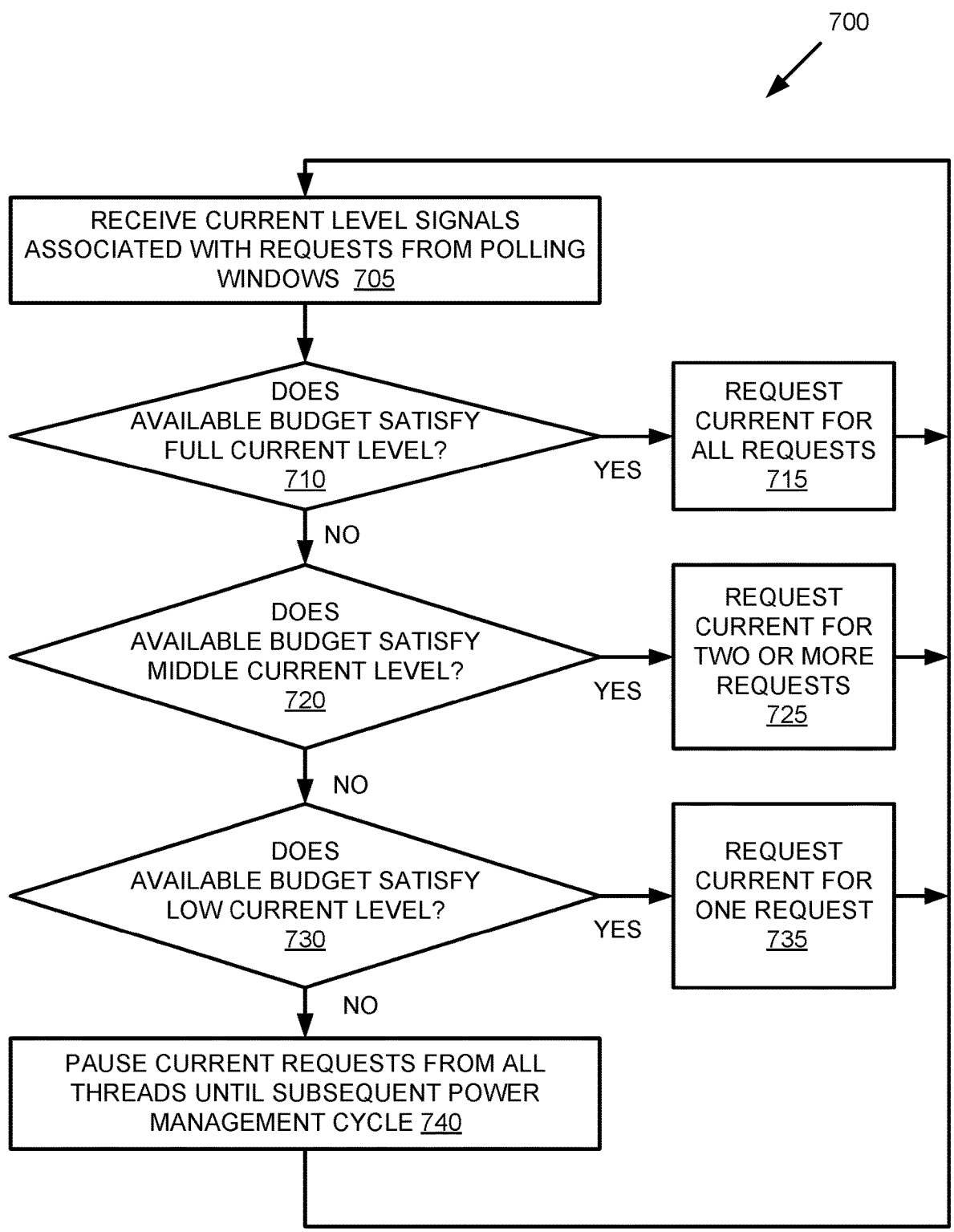
FIG. 7 is a flow diagram of an example method of power budget arbitration in a memory device using a polling window according to at least some embodiments.

FIG. 7 is a flow diagram of an example method of power budget arbitration in a memory device using a polling window according to at least some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the PPM wrapper 150 of FIG. 1A and FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, current level signals are received. For example, processing logic (e.g., PPM 160) can receive one or more current level signals, such as full signal 462, middle signal 464, and low signal 466, associated with a respective set of at least one of the requests in the request registers 452. In one embodiment, the current level signals are based on requests identified during a polling window (e.g., when polling window signal 460 is asserted) between power management cycles. In one embodiment, during the polling window, threads manager 155 receives and storing current request from the processing threads, with each request including an indication of current requested. The amount of current requested can be based on a number of memory access requests pending for each processing thread and the type of memory access requests pending for each processing thread. In one embodiment, each processing thread sends one or more separate requests, such that the threads manager 155 can determine the current request(s) of each processing thread separately, and add the corresponding request(s) to request registers 452.

At operation 710, an available power budget is determined. For example, the processing logic can determine an amount of current available in the memory device during the power management cycle (i.e., once the token is received and the polling window closes). In one embodiment, the PPM 160 receives a signal, such as peak current magnitude indicator signal HC#, indicating the current utilized by each other PPM 160 in the multi-dice package 200 and subtracts that amount from a total amount of current in the memory sub-system 110 or memory device 130 or 130A. In one embodiment, the processing logic compares the total current associated with the full signal 462 (e.g., the sum of all the individual current requests in request registers 452) to the amount of available current during the power management cycle to determine if the available current budget satisfies the full signal 462. If the amount of current available is equal to or greater than the amount of current associated with the full signal 462, the processing logic determines that the amount of current available satisfies the full signal 462.

At operation 715, current is requested and allocated. If the processing logic determines that the amount of current available satisfies the full signal 462, the processing logic can request the amount of current associated with all of the requests in request registers 452. For example, the PPM 160 can issue the request to a common current supply or other power source in the memory device 130 or 130A or memory sub-system 110. The PPM 160 can subsequently allocate the requested current to the processing threads via authorization signal 472, allowing all of the current requests in request registers 452 to be performed.

If the processing logic determines that the amount of current available does not satisfy the full signal 462 request, another current level signal is examined. For example, the processing logic compares the current associated with the middle signal 464 (e.g., the sum two or more current requests in request registers 452) to the amount of available current during the power management cycle to determine if the available current budget satisfies the middle signal 464. If the amount of current available is equal to or greater than the amount of current associated with the middle signal 464, the processing logic determines that the amount of current available satisfies the middle signal 464.

At operation 725, current is requested and allocated. If the processing logic determines that the amount of current available satisfies the amount of current associated with the middle signal 464, the processing logic can request the amount of current associated with the two or more requests from request registers 452. For example, PPM 160 can issue the request to a common current supply or other power source in the memory device 130 or 130A or memory sub-system 110. The PPM 160 can subsequently allocate the requested current to the processing threads via authorization signal 472, allowing two or more of the current requests in request registers 452 to be performed.

If the processing logic determines that the amount of current available does not satisfy the amount of current associated with the middle signal 464, at operation 730, another current level signal is examined. For example, the processing logic compares the current associated with the low signal 466 (e.g., one current request in request registers 452) to the amount of available current during the power management cycle to determine if the available current budget satisfies the low signal 466. If the amount of current available is equal to or greater than the amount of current associated with the low signal 466, the processing logic determines that the amount of current available satisfies the low signal 466.

At operation 735, current is requested and allocated. If the processing logic determines that the amount of current available satisfies the amount of current associated with the low signal 466, the processing logic can request the amount of current associated with one request from request registers 452. For example, the PPM 160 can issue the request to a common current supply or other power source in the memory device 130 or 130A or memory sub-system 110. The PPM 160 can subsequently allocate the requested current to the processing threads via authorization signal 472, allowing one current requests in request registers 452 to be performed.

If the processing logic determines that the amount of current available does not satisfy the amount of current associated with the any of the current level signals, at operation 740, the current requests are paused. For example, the processing logic can pause execution of the processing threads and maintain the current requests from those processing threads until a subsequent power management cycle. In the subsequent power management cycle, there can possibly be a larger amount of available current in the memory device which can be sufficient to satisfy at least one of the requests.

Figure 8:
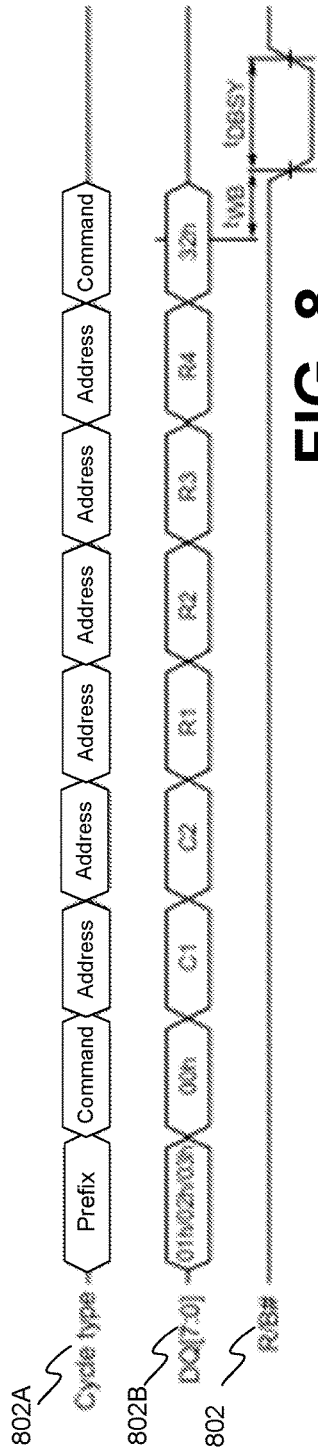
FIG. 8 is a block diagram illustrating a combination of memory command packets and a timing diagram according to at least some embodiments.

FIG. 8 is a block diagram illustrating a combination of memory command packets 802A and 802B and a timing diagram 804 according to at least some embodiments. The memory command packet 802A illustrates a format of the packet in which a prefix can be appended to the command packet, which also includes an initial command, address information to which the memory operation is directed, and a close command to indicate termination of a memory operation associated with the memory command packet 802A. The memory command packet 802B includes possible prefix values, such as 0x1, 0x2, or 0x3 or other such indicators to indicate a read command or program command without priority. In other memory command packets, the possible prefixes include, e.g., 0x41, 0x42, 0x43 or other such designators to indicate a read command or a program command with priority. In disclosed embodiments, an erase command is not prioritized. In these embodiments, the ready/busy signal (RB#) of the memory die, illustrated in the timing graph 804, is asserted while handling of the memory operation associated with the memory command packet 802A or 802B, and is deasserted after completion of the memory operation.

In various embodiments, because the multiple processing threads 334(0)-334(3) can asynchronously correspond to memory access operations such as a read operation or a program operation, the PPM wrapper 150 can be programmed to manage power so that snap reads and other such memory access operations can be prioritized, e.g., over non-prioritized memory operations such as some program operations and any erase operation. Thus, the memory sub-system controller 115 (or other processing device sending memory commands within the memory sub-system 110) can add the prefix value, which indicates prioritization, to different memory command packets for a memory operation sent to the memory device 130 or 130A.

In at least some embodiments, once a die, and thus an individual PPM wrapper 150, receives a memory command packet such as discussed with reference to FIG. 8, the threads manager 155 can parse the memory command packet to access the prefix value, the memory command packet associated with a targeted processing thread of the multiple processing threads 334(0)-334(3). The threads manager 155 can further determine, from the prefix value, whether the memory command packet is prioritized. The threads manager 155 can further, in response to the memory command packet being prioritized, tag the targeted processing thread as being prioritized.

TABLE 3

| Threads with priority (main in priority) | Ring Counter Value |
|---|---|
| Full = Main + coproc1 + coproc2 + coproc3 + coproc4 + coproc5<br>Middle = main + coproc1 + coproc2<br>Low = mainP | 3'b000 |
| Full = Main + coproc1 + coproc2 + coproc3 + coproc4 + coproc5<br>Middle = coproc1 + coproc2 + coproc3<br>Low = mainP | 3'b001 |
| Full = Main + coproc1 + coproc2 + coproc3 + coproc4 + coproc5<br>Middle = coproc2 + coproc3 + coproc4<br>Low = mainP | 3'b010 |
| Full = Main + coproc1 + coproc2 + coproc3 + coproc4 + coproc5<br>Middle = coproc3 + coproc4 + coproc5<br>Low = mainP | 3'b011 |
| Full = Main + coproc1 + coproc2 + coproc3 + coproc4 + coproc5<br>Middle = coproc4 + coproc5 + main<br>Low = mainP | 3'b100 |
| Full = Main + coproc1 + coproc2 + coproc3 + coproc4 + coproc5 | 3'b101 |

TABLE 3-continued

| Threads with priority (main in priority) | Ring Counter Value |
|---|---|
| Middle = coproc5 + main + coproc1 Low = mainP | |

Figure 10A:
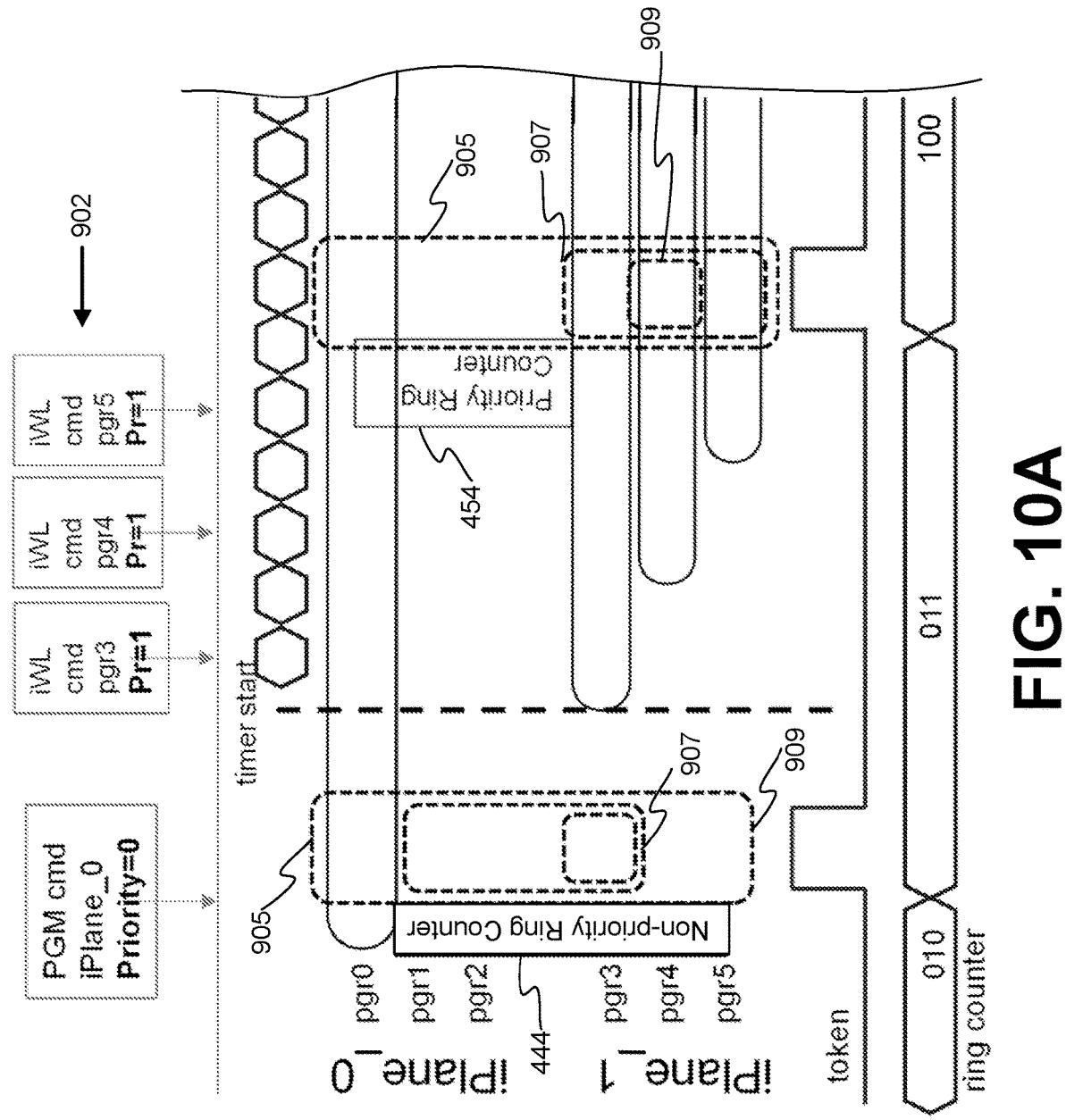
FIGS. 10A-10B are a graph illustrating multi-plane, prioritized power budget arbitration for multiple concurrent memory access operations according to at least some additional embodiments.
Figure 10B:
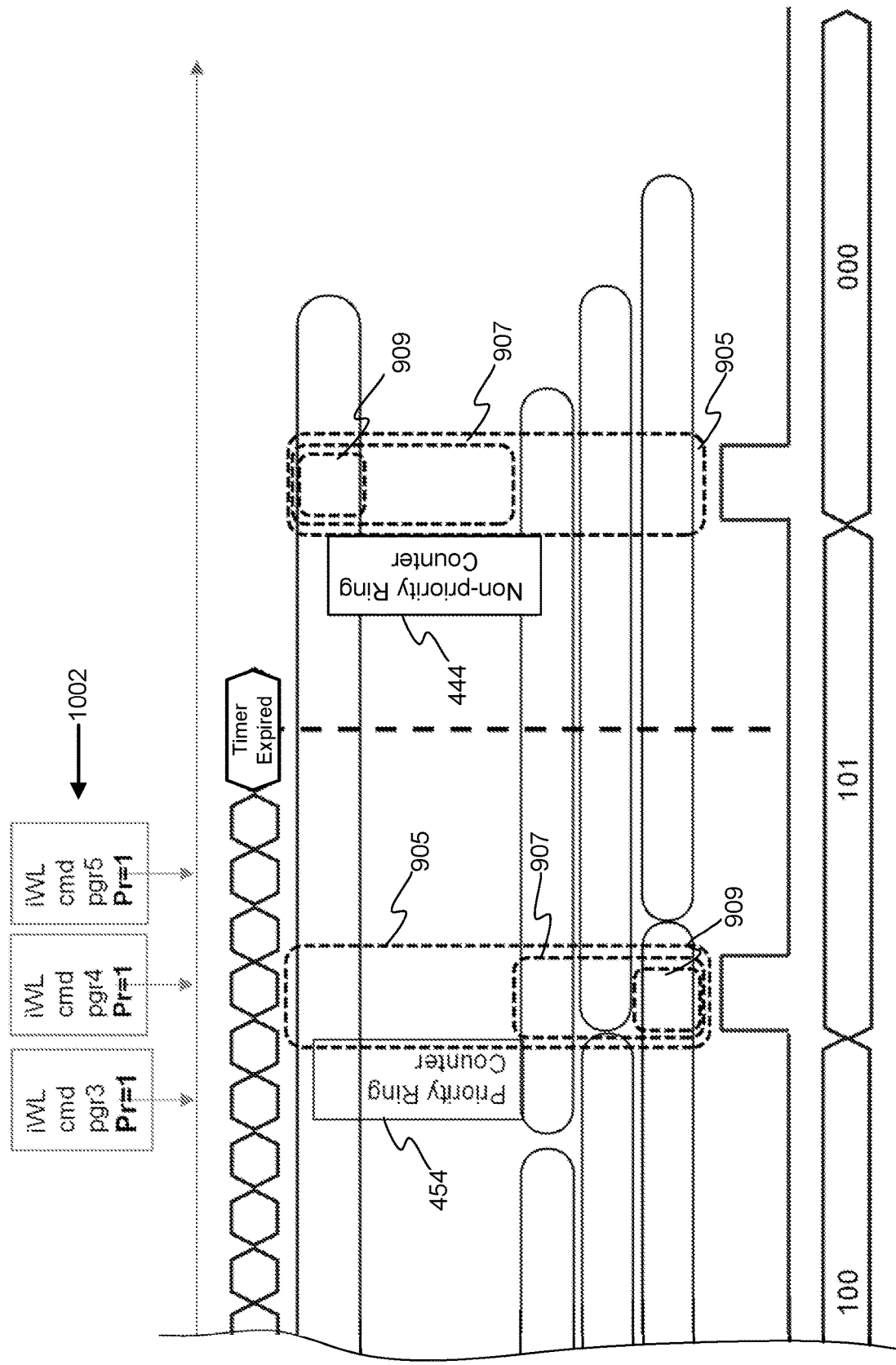
Figure 11:
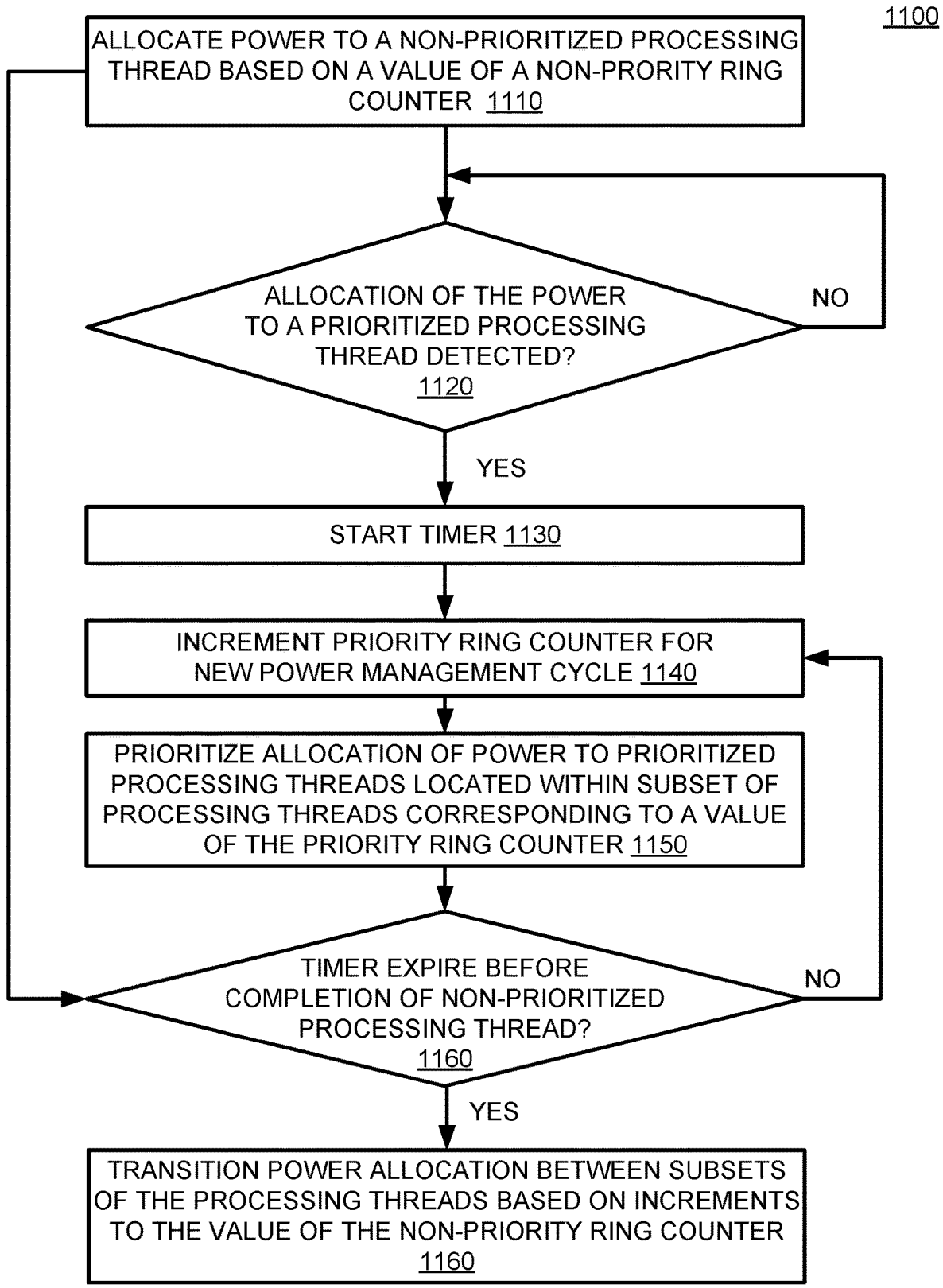
FIG. 11 is a flow diagram of an example method of prioritized power budget arbitration for multiple concurrent processing threads according to at least some embodiments.

With additional reference to FIG. 4, the threads manager 155 can, based on one or more of the multiple processing threads in the request registers 452 being prioritized, select the data structure 458 (from multiple data structures) that includes prioritization indicators associated with the one or more prioritized processing threads within the middle signal 464, or thread combination, and the low signal 468, to leading thread, requests. So long as the set of processing threads retain priority, the threads manager 155 can also increment the priority ring counter 454, where the data structure 458 stores an association between the value of the priority ring counter 454 and a subset of the multiple processing threads 334(0)-334(3), as illustrated in Tables 3-7. In these embodiments, the PPM 160 can then prioritize allocation of power to the one or more prioritized threads during each new power management cycle. FIGS. 10A-10B and FIG. 11 will discuss additional processes by which to ensure that such prioritized processing threads do not starve any non-prioritized processing threads of processing power, e.g., current allocation.

TABLE 4

| Threads with priority (coproc1 & coproc4) | Ring Counter Value |
|---|---|
| Full = Main + coproc1 + coproc2 + coproc3 + coproc4 + coproc5 Middle = main + coproc1P + coproc4P Low = coproc1P | 3'b000 |
| Full = Main + coproc1 + coproc2 + coproc3 + coproc4 + coproc5 Middle = coproc1P + coproc4P + coproc2 Low = coproc4P | 3'b001 |
| Full = Main + coproc1 + coproc2 + coproc3 + coproc4 + coproc5 Middle = coproc1P + coproc4P + coproc3 Low = coproc1P | 3'b010 |
| Full = Main + coproc1 + coproc2 + coproc3 + coproc4 + coproc5 Middle = coproc1P + coproc4P + coproc5 Low = coproc4P | 3'b011 |
| Full = Main + coproc1 + coproc2 + coproc3 + coproc4 + coproc5 Middle = coproc4P + main + coproc1P Low = coproc1P | 3'b100 |
| Full = Main + coproc1 + coproc2 + coproc3 + coproc4 + coproc5 Middle = coproc1P + coproc4P + coproc2 Low = coproc4P | 3'b101 |

In various embodiments, Tables 3-7 illustrate examples of the data structures that can be selected as the data structure 458 for different sets of prioritized processing threads. A prioritized processing thread is labeled with a capital "P" to indicate prioritization. Table 3 illustrates that the leading thread ("Low") is the main processing thread and is prioritized over any other thread combination. In some cases, however, the leading thread can also be included within the thread combination ("Middle") and thus could also be authorized along with one or more additional non-prioritized processing threads.

TABLE 5

| Threads with priority (main & coproc2 & coproc5) | Ring Counter Value |
|---|---|
| Full = Main + coproc1 + coproc2 + coproc3 + coproc4 + coproc5 Middle = mainP + coproc2P + coproc5P Low = mainP | 3'b000 |
| Full = Main + coproc1 + coproc2 + coproc3 + coproc4 + coproc5 Middle = mainP + coproc2P + coproc5P Low = coproc2P | 3'b001 |
| Full = Main + coproc1 + coproc2 + coproc3 + coproc4 + coproc5 Middle = mainP + coproc2P + coproc5P Low = coproc5P | 3'b010 |
| Full = Main + coproc1 + coproc2 + coproc3 + coproc4 + coproc5 Middle = mainP + coproc2P + coproc5P Low = mainP | 3'b011 |
| Full = Main + coproc1 + coproc2 + coproc3 + coproc4 + coproc5 Middle = mainP + coproc2P + coproc5P Low = coproc2P | 3'b100 |
| Full = Main + coproc1 + coproc2 + coproc3 + coproc4 + coproc5 Middle = mainP + coproc2P + coproc5P Low = coproc5P | 3'b101 |

In one embodiment, Table 4 illustrates priority between two different processing threads, namely coproc1 and coproc4, at least one of which is the leading thread ("Min") for each respective value of the priority ring counter 454. In this embodiment, these two prioritized processing threads are also located within the thread combination ("Middle"). Assuming the priority ring counter 454 is incremented four times (through value 011), the PPM 160 can achieve uniformity in allocation of power to the prioritized processing threads. Thus, in some embodiments, the values of "100" and "101" of the priority ring counter 454 are not included in an incrementing cycle.

In one embodiment, Table 5 illustrates priority between three different processing threads, namely main, coproc2, and coproc5. Because the data structure 458 represented by Table 5 is programmed with these three prioritized threads into the middle signal 464 and the low signal 466 requests, the PPM 160 can allocate power to these prioritized processing threads in cases where there is insufficient power budget to allocate to all of the multiple processing threads.

TABLE 6

| Threads with priority (main & coproc1 & coproc2 & coproc5) | Ring Counter Value |
|---|---|
| Full = Main + coproc1 + coproc2 + coproc3 + coproc4 + coproc5 Middle = mainP + coproc1P + coproc2P Low = mainP | 3'b000 |
| Full = Main + coproc1 + coproc2 + coproc3 + coproc4 + coproc5 Middle = coproc1P + coproc2P + coproc5P Low = coproc1P | 3'b001 |
| Full = Main + coproc1 + coproc2 + coproc3 + coproc4 + coproc5 Middle = coproc2P + coproc5P + mainP Low = coproc2P | 3'b010 |
| Full = Main + coproc1 + coproc2 + coproc3 + coproc4 + coproc5 Middle = coproc5P + mainP + coproc1P Low = coproc5P | 3'b011 |
| Full = Main + coproc1 + coproc2 + coproc3 + | 3'b100 |

TABLE 6-continued

| Threads with priority (main & coproc1 & coproc2 & coproc5) | Ring Counter Value |
|---|---|
| coproc4 + coproc5<br>Middle = mainP + coproc2P + coproc5P<br>Low = mainP | |
| Full = Main + coproc1 + coproc2 + coproc3 + coproc4 + coproc5<br>Middle = mainP + coproc2P + coproc5P<br>Low = coproc1P | 3'b101 |

In one embodiment, Table 6 illustrates priority between four different processing threads, namely main, coproc1, coproc2, and coproc5. Because the data structure 458 represented by Table 5 is programmed with these three prioritized threads into the middle signal 464 and the low signal 466 requests, the PPM 160 can allocate power to these prioritized processing threads in cases where there is insufficient power budget to allocate to all of the multiple processing threads. Further, assuming the priority ring counter 454 is incremented four times (through value 011), the PPM 160 can achieve uniformity in allocation of power to the prioritized processing threads. Thus, in some embodiments, the values of "100" and "101" of the priority ring counter 454 are not included in an incrementing cycle.

TABLE 7

| Threads with priority (main & coproc1 & coproc2 & coproc4 & coproc5) | Ring Counter Value |
|---|---|
| Full = Main + coproc1 + coproc2 + coproc3 + coproc4 + coproc5<br>Middle = mainP + coproc1P + coproc2P<br>Low = mainP | 3'b000 |
| Full = Main + coproc1 + coproc2 + coproc3 + coproc4 + coproc5<br>Middle = coproc1P + coproc2P + coproc4P<br>Low = coproc1P | 3'b001 |
| Full = Main + coproc1 + coproc2 + coproc3 + coproc4 + coproc5<br>Middle = coproc2P + coproc4P + coproc5P<br>Low = coproc2P | 3'b010 |
| Full = Main + coproc1 + coproc2 + coproc3 + coproc4 + coproc5<br>Middle = coproc4P + coproc5P + mainP<br>Low = coproc4P | 3'b011 |
| Full = Main + coproc1 + coproc2 + coproc3 + coproc4 + coproc5<br>Middle = coproc5P + mainP + coproc1P<br>Low = coproc5P | 3'b100 |
| Full = Main + coproc1 + coproc2 + coproc3 + coproc4 + coproc5<br>Middle = mainP + coproc2P + coproc5P<br>Low = coproc1P | 3'b101 |

In one embodiment, Table 7 illustrates priority between five different processing threads, namely main, coproc1, coproc2, coproc4, and coproc5. Because the data structure 458 represented by Table 7 is programmed with these three prioritized threads into the middle signal 464 and the low signal 466 requests, the PPM 160 can allocate power to these prioritized processing threads in cases where there is insufficient power budget to allocate to all of the multiple processing threads. Further, assuming the priority ring counter 454 is incremented five times (through value "100"), the PPM 160 can achieve uniformity in allocation of power to the prioritized processing threads. Thus, in some embodiments, the value of "101" of the priority ring counter 454 is not included in an incrementing cycle.

Thus, it can be seen that the one or more prioritized processing threads, which relates to given counter value, includes the leading thread in the low signal 466 that is a main processing thread of the memory die in one embodiment. In another embodiment, the one or more prioritized processing threads includes the leading thread and one or more processing threads of a thread combination, e.g., the middle signal 464 within the subset of the multiple processing threads. This subset, e.g., the combination of the leading thread and the thread combination, can therefore, be understood to include all prioritized processing threads.

With additional reference to FIG. 4, in at least some embodiments, the PPM 160 determines a total amount of current available budget for power consumption, which can be determined based on a quantized amount of current to be consumed by the multiple memory dice during the power management cycle, as discussed previously. The PPM 160 can further determine an amount of power demand associated with the multiple processing threads, and in response to determining that the amount of available budget satisfies the amount of power demand, allocate the amount of power demand to the plurality of processing threads.

With additional reference to FIG. 4, in at least some embodiments, the PPM 160 allocates current to each respective prioritized processing thread of the one or more prioritized processing threads followed by allocating current to any non-prioritized processing thread of the subset of the plurality of processing threads. So, for example, in Table 4, there is at least one processing thread within the middle signal 464 that is not prioritized. The PPM 160 can further track a total amount of current allocated to the one or more prioritized processing threads and to any non-prioritized processing threads and, in response to an amount of current for a new current allocation exceeding the available budget less the total amount of current already allocated, pause allocation of current to any new processing thread. In this way, the PPM 160 ensures that, despite prioritizing allocation of power to the one or more prioritized processing threads, the overall allocated power does not exceed the available budget of current (e.g., power).

Figure 9:
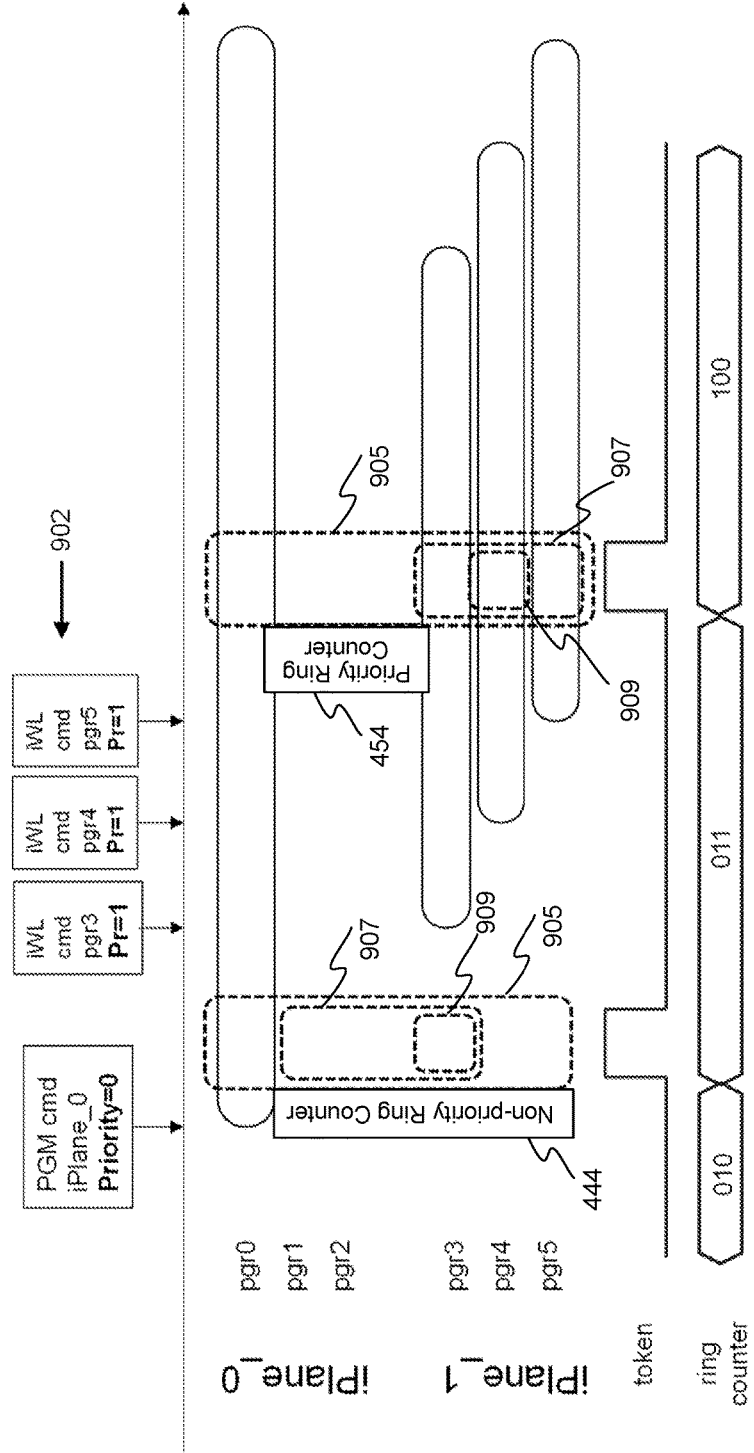
FIG. 9 is a graph illustrating multi-plane, prioritized power budget arbitration for multiple concurrent memory access operations according to at least some embodiments.

FIG. 9 is a graph illustrating multi-plane, prioritized power budget arbitration for multiple concurrent memory access operations according to at least some embodiments. A series of concurrent memory operations 902 are illustrated along a top of the graph, including a non-prioritized operation ("pgr0"), a program operation for this example, followed by a series of additional asynchronous program operations (e.g., iWL commands "pgr3," "pgr4," and "pgr5"), which are prioritized. When the PPM 160 receives the token (illustrated in the timing graph at bottom), the non-priority ring counter 444 has a value of "011" and only the non-prioritized program operation is running and is thus allocated power assuming sufficient available current budget. Each dashed indicator 905 is associated with the full signal 462, each dashed indicator 907 is associated with the middle signal 464, and each dashed indicator 909 is associated with the low signal 466, which were discussed. Thus, the three prioritized processing threads (pgr3, pgr4, and pgr5) are encompassed within the middle signal 464 while the pgr4 is the leading thread encompassed within the low signal 466.

In response to the PPM 160 allocating power (e.g., current) to a prioritized processing thread (e.g., "pgr3"), the threads manager 155 can, before the end of the polling period associated with the polling window signal 460, increment the value of the priority ring counter 454, e.g., which in this example is a value of "100." Thus, the management of power allocation has passed to prioritized allocation governed by the value of the priority ring counter 454. This operation includes ensuring, during the power management cycle when the PPM 160 holds the token, that the amount of current for a new current allocation does not exceed an available budget less the total amount of currently already allocated by the PPM 160.

In these embodiments, if the amount of current for a new current allocation, e.g., to the pgr5 prioritized processing thread, does exceed an available budget less the total amount of currently already allocated, then the PPM 160 pauses allocation of power (or current) to non-prioritized processing thread, pgr0. If pausing allocation to the non-prioritized processing thread does not free up enough power budget to handle the pgr5 prioritized processing thread, then the PPM 160 may have to further pause allocating power to any new processing threads until sufficient budget is made available. In this way, the prioritized threads are prioritized over the non-prioritized processing threads. While these operations explained with reference to FIG. 9 allow prioritization of processing threads indicated as prioritized within the low signal 466 or the middle signal 464, these operations do not ensure that the non-prioritized processing thread, pgr0, is not starved of power indefinitely or for an unacceptably long time.

FIGS. 10A-10B are a graph illustrating multi-plane, prioritized power budget arbitration for multiple concurrent memory access operations according to at least some additional embodiments, which are to ensure that the non-prioritized processing thread, pgr0, discussed with referenced to FIG. 9, is not starved of power. FIG. 10A generally tracks what is illustrated with reference to FIG. 9, for example, that control logic of the PPM wrapper 150 allocates power to the non-prioritized processing thread, pgr0, of multiple processing threads based on a value of the non-priority ring counter 444.

Different than FIG. 9, however, FIG. 10A illustrates that the control logic (e.g., of the threads manager 155) starts the timer 478 while the non-prioritized processing thread, pgr0, is running and in response to detecting allocation of the power to a prioritized processing thread, pgr3, of the one or more prioritized processing threads (pgr3, pgr4, pgr5). Further, FIG. 10B also illustrates two additional subsequent power management cycles in which the PPM 160 receives the token. In the third power management cycle, the timer 478 has not expired, and therefore, the threads manager 155 still increments the value of the priority ring counter 454 for each power management cycle, this time to a value of "101" so that the PPM 160 can still prioritize the one or more prioritized processing threads. More specifically, the control logic of the PPM 160 prioritizes allocation of the power to the one or more prioritized processing threads located within a subset of the multiple processing threads corresponding to a value of the priority ring counter 454. While the thread combination of the middle signal 464 sent to the PPM 160 still includes the three prioritized processing threads pgr3, pgr4, and pgr5, the leading thread of the low signal 466 has shifted to the pgr5 prioritized processing thread.

With continued reference to FIG. 10B, and in at least some embodiments, in response to the timer 478 expiring before completion of the non-prioritized processing thread, pgr0, the threads manager 155 transitions power allocation between subsets of the multiple processing threads based on increments to the value of the non-priority ring counter 454. In these embodiments, these subsets of the multiple processing threads can be those associated with the full signal 462, the middle signal 464, and the low signal 466 of Table 2 and FIGS. 6-7, in which the individual processing threads are not tagged or identified as being prioritized. This means that the non-prioritized processing threads will get equal power sharing, depending on the state or value of the non-priority processing counter 444. This transition is illustrated during the fourth power management cycle in which the leading thread (indicator 909) is now the pgr0 processing thread and the thread combination (indicator 907) includes the pgr0 processing thread. Thus, the PPM 160 will allocate available power budget to the non-prioritized processing thread, pgr0, during this fourth power management cycle, avoiding starving the pgr0 processing thread of power.

In some embodiments, although not specifically illustrated, upon detecting completion of the previously non-prioritized processing thread, pgr0, control logic of the threads manager 155 resets the timer 478. In other embodiments, the threads manager 155 resets the time in response to completion of all previously non-prioritized processing threads. Then, again, while the timer is running, the threads manager increments the priority ring counter 454 before each power management cycle so that the PPM 160 can prioritize allocation of the power to the one or more prioritized processing threads located within the subset of the multiple processing threads corresponding to the value of the priority ring counter 454, e.g., as illustrated in Tables 3-7. In this way, the control logic of the PPM wrapper 150 can transition back to prioritized power management until a situation occurs in which the PPM 160 allocates power to at least one non-prioritized processing thread and at least one prioritized processing threads. In response to such a situation, the threads manager 155 can again start the timer 478 as illustrated in FIG. 10A.

FIG. 11 is a flow diagram of an example method of prioritized power budget arbitration for multiple concurrent processing threads according to at least some embodiments. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the PPM wrapper 150 of FIG. 1A and FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1110, a non-prioritized processing threads is allocated power. More specifically, the processing logic allocates power to a non-prioritized processing thread of multiple processing threads based on a value of a non-priority ring counter, the multiple processing threads to execute memory access operations on the memory array 370 (FIG. 3). The non-priority ring counter can be the non-priority ring counter 44 of FIG. 4.

At operation 1120, allocation of power to a prioritized processing thread is detected More specifically, the processing logic determines whether allocation of the power to a prioritized processing thread has been detected. This creates the situation just discussed in which at least one non-prioritized processing thread and at least one prioritized processing thread has been allocated power and are running concurrently.

At operation 1130, at timer is started. More specifically, in response to an affirmative detection of allocation of power to the prioritized processing thread, the control logic starts a timer, such as the timer 478 (FIG. 4).

At operation 1140, a priority ring counter is incremented. More specifically, while the timer is running, the processing logic increments a priority ring counter before each power management cycle. The priority ring counter can be the priority ring counter 454 of FIG. 4.

At operation 1150, prioritized processing threads are prioritized. More specifically, while the timer is running, the processing logic prioritizes allocation of the power to the one or more prioritized processing threads located within a subset of the multiple processing threads corresponding to a value of the priority ring counter.

At operation 1160, timer expiration is checked. More specifically, the processing logic, determine whether the timer expires before completion of the non-prioritized processing thread. If the answer is no, at operation 1160, then the method 1100 cycles back to operations 1140 and 1150 and continues with prioritized power management, as was done at power management cycle three with reference to FIGS. 10A-10B.

At operation 1160, power management transitions back to non-prioritized management. More specifically, in response to the timer expiring before completion of the non-prioritized processing thread, the processing logic transitions power allocation between subsets of the multiple processing threads based on increments to the value of the non-priority ring counter.

Figure 12:
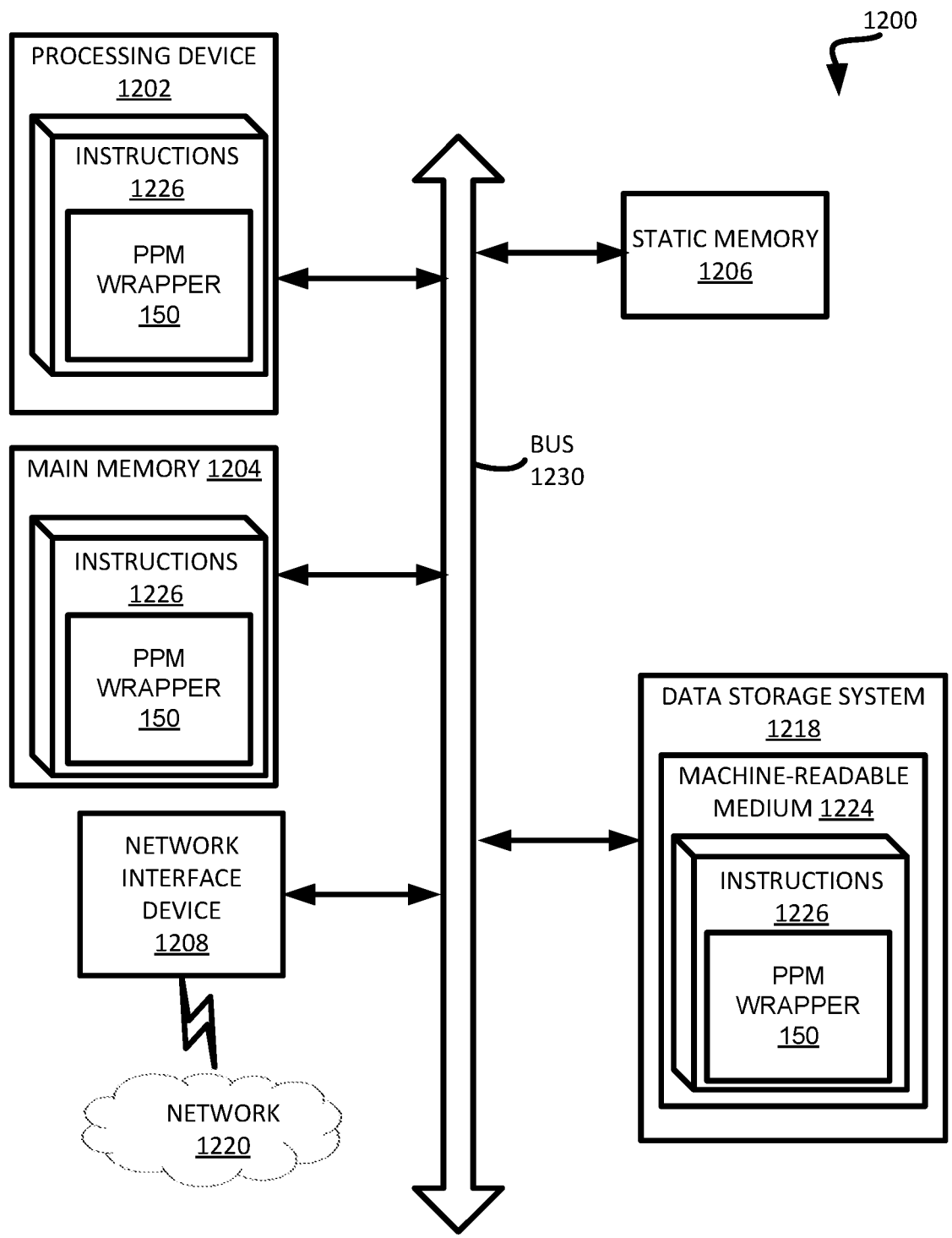
FIG. 12 is a block diagram of an example computer system in which embodiments of the present disclosure can operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the PPM wrapper 150 of FIGS. 1A, 4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium, such as a non-transitory computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory sub-system 110 of FIG. 1A.

In one embodiment, the instructions 1226 include instructions to implement functionality corresponding to the PPM wrapper 150 of FIGS. 1A, 4. While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a memory array; and
   control logic, operatively coupled with the memory array, to perform operations comprising:
      allocating power to one or more prioritized processing threads, of a plurality of processing threads that access the memory array, based on a value of a priority ring counter;
      starting a timer in response to detecting allocation of the power to a non-prioritized processing thread of the plurality of processing threads; and
      while the timer is running:
         incrementing the priority ring counter before each power management cycle; and
         prioritizing allocation of the power to the one or more prioritized processing threads located within a subset of the plurality of processing threads corresponding to a value of the priority ring counter.

2. The memory device of claim 1, wherein the operations further comprise:
   detecting completion of the non-prioritized processing thread;
   resetting the timer; and
   while the timer is running:
      incrementing the priority ring counter before each power management cycle; and
      prioritizing allocation of the power to the one or more prioritized processing threads located within a subset of the plurality of processing threads corresponding to the value of the priority ring counter.

3. The memory device of claim 1, wherein the operations further comprise identifying the one or more prioritized processing threads associated with the plurality of processing threads for each power management cycle, wherein the one or more prioritized processing threads comprises one of:
   a leading thread that is a main processing thread of a memory die; or
   the leading thread and one or more processing threads of a thread combination within the subset of the plurality of processing threads.

4. The memory device of claim 3, wherein, to identify the one or more prioritized processing threads, the operations further comprising, for each memory access operation:
   parsing a memory command packet to access a prefix value, the memory command packet associated with a targeted processing thread of the plurality of processing threads;
   determining, from the prefix value, whether the memory command packet is prioritized; and
   in response to the memory command packet being prioritized, tagging the targeted processing thread as being prioritized.

5. The memory device of claim 1, further comprising a data structure, wherein the control logic comprises the priority ring counter, the data structure to store an association between the value of the priority ring counter and each subset of the plurality of processing threads.

6. The memory device of claim 1, wherein the operations further comprise, while the timer is running:
   allocating current to each respective prioritized processing thread of the one or more prioritized processing threads;
   tracking a total amount of current allocated to the one or more prioritized processing threads and to the non-prioritized processing thread; and
   in response to an amount of current for a new current allocation exceeding an available budget less the total amount of current already allocated, pausing allocation of current to the non-prioritized processing thread.

7. The memory device of claim 1, wherein the operations further comprise:
   determining an amount of available budget for power consumption based on a quantized amount of current to be consumed by a plurality of memory dice during the power management cycle;
   determining an amount of power demand associated with the plurality of processing threads; and in response to determining that the amount of available budget satisfies the amount of power demand, allocating the amount of power demand to the plurality of processing threads.

8. A memory device comprising:
a plurality of memory dice, each memory die of the plurality of memory dice comprising: a memory array; and
control logic, operatively coupled with the memory array, to perform operations comprising:
  allocating power to one or more prioritized processing threads, of a plurality of processing threads that access the memory array, based on a value of a priority ring counter;
  starting a timer in response to detecting allocation of the power to a non-prioritized processing thread of the plurality of processing threads; and
  while the timer is running:
    incrementing the priority ring counter before each power management cycle; and
    prioritizing allocation of the power to the one or more prioritized processing threads located within a subset of the plurality of processing threads corresponding to a value of the priority ring counter.

9. The memory device of claim 8, wherein the operations further comprise:
detecting completion of the non-prioritized processing thread;
resetting the timer; and while the timer is running:
  incrementing the priority ring counter before each power management cycle; and
  prioritizing allocation of the power to the one or more prioritized processing threads located within a subset of the plurality of processing threads corresponding to the value of the priority ring counter.

10. The memory device of claim 8, wherein the operations further comprise identifying the one or more prioritized processing threads associated with the plurality of processing threads for each power management cycle, wherein the one or more prioritized processing threads comprises one of:
a leading thread that is a main processing thread of a memory die; or
the leading thread and one or more processing threads of a thread combination within the subset of the plurality of processing threads.

11. The memory device of claim 8, wherein, to identify the one or more prioritized processing threads, the operations further comprising, for each memory access operation:
parsing a memory command packet to access a prefix value, the memory command packet associated with a targeted processing thread of the plurality of processing threads;
determining, from the prefix value, whether the memory command packet is prioritized; and
in response to the memory command packet being prioritized, tagging the targeted processing thread as being prioritized.

12. The memory device of claim 8, wherein each die further comprises a data structure, wherein the control logic comprises the priority ring counter, the data structure to store an association between the value of the priority ring counter and each subset of the plurality of processing threads.

13. The memory device of claim 8, wherein the operations further comprise, while the timer is running:

allocating current to each respective prioritized processing thread of the one or more prioritized processing threads;
tracking a total amount of current allocated to the one or more prioritized processing threads and to the non-prioritized processing thread; and
in response to an amount of current for a new current allocation exceeding an available budget less the total amount of current already allocated, pausing allocation of current to the non-prioritized processing thread.

14. The memory device of claim 8, wherein the operations further comprise:
determining an amount of available budget for power consumption based on a quantized amount of current to be consumed by a plurality of memory dice during the power management cycle;
determining an amount of power demand associated with the plurality of processing threads; and
in response to determining that the amount of available budget satisfies the amount of power demand, allocating the amount of power demand to the plurality of processing threads.

15. A method comprising:
allocating, by control logic of a memory die comprising a memory array, power to one or more prioritized processing threads, of a plurality of processing threads that access the memory array, based on a value of a non-priority ring counter;
starting, by the control logic, a timer in response to detecting allocation of the power to a non-prioritized processing thread of the plurality of processing threads; and
while the timer is running:
  incrementing a priority ring counter before each power management cycle; and
  prioritizing allocation of the power to the one or more prioritized processing threads located within a subset of the plurality of processing threads corresponding to a value of the priority ring counter.

16. The method of claim 15, further comprising:
detecting completion of the non-prioritized processing thread; resetting the timer; and
while the timer is running:
  incrementing the priority ring counter before each power management cycle; and
  prioritizing allocation of the power to the one or more prioritized processing threads located within a subset of the plurality of processing threads corresponding to the value of the priority ring counter.

17. The method of claim 15, further comprising identifying the one or more prioritized processing threads associated with the plurality of processing threads for each power management cycle, wherein the one or more prioritized processing threads comprises one of:
a leading thread that is a main processing thread of the memory die; or
the leading thread and one or more processing threads of a thread combination within the subset of the plurality of processing threads.

18. The method of claim 15, wherein, to identify the one or more prioritized processing threads, the method further comprising, for each memory access operation:
parsing a memory command packet to access a prefix value, the memory command packet associated with a targeted processing thread of the plurality of processing threads;

determining, from the prefix value, whether the memory command packet is prioritized; and in response to the memory command packet being prioritized, tagging the targeted processing thread as being prioritized.

19. The method of claim 15, further comprising, while the timer is running:

allocating current to each respective prioritized processing thread of the one or more prioritized processing threads;

tracking a total amount of current allocated to the one or more prioritized processing threads and to the non-prioritized processing thread; and in response to an amount of current for a new current allocation exceeding an available budget less the total amount of current already allocated, pausing allocation of current to the non-prioritized processing thread.

20. The method of claim 15, further comprising:

determining an amount of available budget for power consumption based on a quantized amount of current to be consumed by a plurality of memory dice during the power management cycle;

determining an amount of power demand associated with the plurality of processing threads; and in response to determining that the amount of available budget satisfies the amount of power demand, allocating the amount of power demand to the plurality of processing threads.

* * * * *